(12) United States Patent
Cederberg et al.

(10) Patent No.: US 12,358,365 B1
(45) Date of Patent: Jul. 15, 2025

(54) VEHICLES HAVING COMPOSITE INTERWOVEN GAS CONTAINMENT ASSEMBLIES

(71) Applicant: Agility Fuel Systems LLC, Costa Mesa, CA (US)

(72) Inventors: Chad Alvin Cederberg, Lincoln, NE (US); Ken C. Halvorsen, Lincoln, NE (US); Bradley J. Moutray, Omaha, NE (US); Brian C. Yeggy, Lincoln, NE (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 18/937,967

(22) Filed: Nov. 5, 2024

Related U.S. Application Data

(63) Continuation-in-part of application No. 18/490,647, filed on Oct. 19, 2023, now Pat. No. 12,169,046,
(Continued)

(51) Int. Cl.
*B60K 15/063* (2006.01)
*B62D 21/02* (2006.01)
(Continued)

(52) U.S. Cl.
CPC ............ *B60K 15/063* (2013.01); *B62D 21/02* (2013.01); *F17C 1/06* (2013.01);
(Continued)

(58) Field of Classification Search
CPC ...... F17C 1/04; F17C 1/05; F17C 2203/0665; F17C 2203/067; F17C 2203/0675; F17C 2265/066; B60K 2015/0636
See application file for complete search history.

(56) References Cited

U.S. PATENT DOCUMENTS

| 2,479,828 A | 8/1949 | Geckler |
| 2,723,705 A | 11/1955 | Collins |

(Continued)

FOREIGN PATENT DOCUMENTS

| DE | 10 2017 205190 | 4/2018 |
| DE | 10 2017 208492 | 11/2018 |

(Continued)

OTHER PUBLICATIONS

U.S. Appl. No. 18/490,647, Composite Interwoven Gas Containment Assenblies, filed Oct. 19, 2023.
(Continued)

*Primary Examiner* — Jeffrey J Restifo
(74) *Attorney, Agent, or Firm* — Knobbe, Martens, Olson & Bear, LLP

(57) ABSTRACT

A vehicle is provided. The vehicle can include a cab, a plurality of wheels, one or more frame rails, an engine or power generation system, and a pressure vessel. The frame rails are configured to support the cab and the plurality of wheels. The engine or power generation system are configured to be powered by a fuel. The pressure vessel is configured to store the fuel to be used by the engine or power generation system. The pressure vessel can include a structural shell formed by filament winding upon a substantially cylindrical form.

16 Claims, 20 Drawing Sheets

Related U.S. Application Data which is a continuation of application No. PCT/US2022/027890, filed on May 5, 2022.

(60) Provisional application No. 63/201,667, filed on May 7, 2021.

(51) Int. Cl.
*F17C 1/06* (2006.01)
*B60K 15/03* (2006.01)

(52) U.S. Cl.
CPC .............. *B60K 2015/03486* (2013.01); *B60K 2015/0636* (2013.01); *F17C 2201/0109* (2013.01); *F17C 2203/0634* (2013.01); *F17C 2265/066* (2013.01); *F17C 2270/0171* (2013.01)

(56) References Cited

U.S. PATENT DOCUMENTS

| | | |
|---|---|---|
| 3,312,575 A | 4/1967 | Corbin, Jr. |
| 3,321,347 A | 5/1967 | Price et al. |
| 3,669,816 A | 6/1972 | Smith |
| 3,795,573 A | 3/1974 | Smith et al. |
| 3,843,010 A | 10/1974 | Morse et al. |
| 4,191,304 A | 3/1980 | Schiedat |
| 4,438,858 A | 3/1984 | Grover |
| 4,660,738 A | 4/1987 | Ives |
| 4,760,949 A | 8/1988 | Elias |
| 5,150,812 A | 9/1992 | Adams |
| 5,287,987 A | 2/1994 | Gaiser |
| 5,287,988 A | 2/1994 | Murray |
| 5,368,184 A | 11/1994 | Fay et al. |
| 5,419,139 A | 5/1995 | Blum et al. |
| 5,499,739 A | 3/1996 | Greist, III et al. |
| 5,567,296 A | 10/1996 | Luch |
| 5,577,630 A | 11/1996 | Blair |
| 5,758,796 A | 6/1998 | Nishimura et al. |
| 5,798,156 A | 8/1998 | Mitkitsky |
| 5,822,838 A | 10/1998 | Seal et al. |
| 6,145,692 A | 11/2000 | Cherevatsky |
| 6,510,961 B1 | 1/2003 | Head et al. |
| 6,630,529 B2 | 10/2003 | Robichaud |
| 6,708,502 B1 | 3/2004 | Aceves |
| 7,208,207 B2 | 4/2007 | Ono et al. |
| 7,211,307 B2 | 5/2007 | Potter et al. |
| 7,641,949 B2 * | 1/2010 | DeLay .................. B29C 53/602 220/586 |
| 7,735,536 B2 | 6/2010 | Mukai et al. |
| 7,743,940 B2 | 6/2010 | Brunnhofer |
| 7,810,754 B2 | 10/2010 | Uozumi et al. |
| 7,815,141 B2 | 10/2010 | Uozumi et al. |
| 7,832,235 B2 | 11/2010 | Neubert et al. |
| 7,905,442 B2 * | 3/2011 | Uozumi .................. B29C 53/70 242/445.1 |
| 8,048,248 B2 | 11/2011 | Neubert |
| 8,074,826 B2 | 12/2011 | Cronin et al. |
| 8,113,457 B2 | 2/2012 | Tanigawa et al. |
| 8,308,017 B2 | 11/2012 | Schlag |
| 8,313,595 B2 | 11/2012 | Blanc et al. |
| 8,602,250 B2 * | 12/2013 | Berger ..................... D04C 1/06 220/586 |
| 9,011,622 B2 | 4/2015 | Radtke |
| 9,074,685 B2 | 7/2015 | Strack et al. |
| 9,156,202 B2 * | 10/2015 | Tanigawa ............ B29C 53/8016 |
| 9,302,437 B2 | 4/2016 | Radtke |
| 9,545,770 B2 | 1/2017 | Miller |
| 9,688,508 B2 * | 6/2017 | Tanigawa ................ H01M 8/04 |
| 9,878,611 B1 | 1/2018 | Abd et al. |
| 9,884,552 B2 * | 2/2018 | Sloan .................... F17C 13/083 |
| 10,125,924 B2 | 11/2018 | Sinha et al. |
| 10,240,720 B2 | 3/2019 | Cola et al. |
| 10,287,052 B2 * | 5/2019 | Vanswijgenhoven ..... F17C 1/02 |
| 10,514,129 B2 * | 12/2019 | Kampf ..................... F17C 1/10 |
| 10,619,794 B2 * | 4/2020 | Veenstra ................... F17C 1/06 |
| 10,641,431 B2 | 5/2020 | Mallick et al. |
| 10,696,155 B2 * | 6/2020 | Sloan ..................... B60T 17/06 |
| 10,737,445 B1 | 8/2020 | Kayhart et al. |
| 10,823,333 B2 | 11/2020 | Criel et al. |
| 10,940,663 B2 * | 3/2021 | Takemoto ............. B29C 53/602 |
| 11,015,762 B2 | 5/2021 | Mauieu et al. |
| 11,040,479 B2 * | 6/2021 | Kono ......................... C08J 5/06 |
| 11,098,851 B2 * | 8/2021 | Ueda ........................ F17C 1/00 |
| 11,204,131 B2 * | 12/2021 | Umetsu ..................... F17C 1/00 |
| 11,262,025 B2 | 3/2022 | Kim |
| 11,312,229 B1 | 4/2022 | Yordanov et al. |
| 11,345,331 B2 * | 5/2022 | McKibben ............ B60K 15/03 |
| 11,353,160 B2 * | 6/2022 | DeLay ...................... F17C 1/06 |
| 11,384,902 B2 * | 7/2022 | Watanabe ............... B29C 70/32 |
| 11,421,824 B2 * | 8/2022 | Sawai ....................... F17C 1/06 |
| 11,435,033 B2 * | 9/2022 | Nouwen ............ B29C 70/0035 |
| 11,440,399 B2 * | 9/2022 | Yordanov ................ F17C 1/06 |
| 11,559,964 B2 | 1/2023 | Benson |
| 11,560,982 B2 | 1/2023 | Volkmer et al. |
| 11,598,483 B2 * | 3/2023 | Tatsushima ............... F17C 1/06 |
| 11,828,417 B2 | 11/2023 | Clarke et al. |
| 11,835,178 B2 * | 12/2023 | Baumer ..................... F17C 1/16 |
| 11,940,097 B2 | 3/2024 | Clarke |
| 11,940,098 B2 | 3/2024 | Volkmer et al. |
| 12,054,040 B2 * | 8/2024 | Koti ........................ B60K 11/04 |
| 12,055,268 B2 * | 8/2024 | Urushiyama ............. F17C 1/06 |
| 12,085,228 B2 | 9/2024 | Nagamatsu |
| 12,123,550 B2 * | 10/2024 | Lee ............................ F17C 1/06 |
| 12,169,046 B2 * | 12/2024 | Cederberg ............... F17C 1/16 |
| 12,203,596 B2 * | 1/2025 | Tatsushima ............. B29C 70/16 |
| 2002/0041823 A1 | 4/2002 | Blaszczyk |
| 2002/0053573 A1 | 5/2002 | Bowen et al. |
| 2004/0056309 A1 | 3/2004 | Yeh |
| 2005/0077643 A1 | 4/2005 | Matsuoka |
| 2005/0191435 A1 | 9/2005 | Bauman |
| 2009/0057319 A1 | 3/2009 | Schlag |
| 2009/0308874 A1 | 12/2009 | Lindner |
| 2011/0210475 A1 | 9/2011 | Strack et al. |
| 2011/0220660 A1 | 9/2011 | Strack |
| 2011/0288738 A1 * | 11/2011 | Donnelly ............ F02D 19/0665 701/99 |
| 2011/0304083 A1 | 12/2011 | Strack |
| 2012/0024745 A1 * | 2/2012 | Otsuka .................... F17C 13/06 156/187 |
| 2012/0214088 A1 | 8/2012 | Breuer |
| 2013/0299504 A1 | 11/2013 | Koppert |
| 2013/0313266 A1 | 11/2013 | Andernach et al. |
| 2014/0008373 A1 | 1/2014 | Sharp et al. |
| 2014/0061266 A1 * | 3/2014 | Milton ............. B60K 15/03006 224/404 |
| 2014/0069972 A1 * | 3/2014 | Willemsen ........... B60K 15/063 224/401 |
| 2014/0137953 A1 * | 5/2014 | Gibb ...................... B60K 15/07 137/351 |
| 2014/0217107 A1 * | 8/2014 | Sloan ........................ B60P 7/12 29/428 |
| 2014/0272670 A1 | 9/2014 | Strack |
| 2015/0044407 A1 | 2/2015 | Som et al. |
| 2015/0096994 A1 | 4/2015 | Radtke |
| 2015/0192251 A1 | 7/2015 | Tupper et al. |
| 2015/0240993 A1 | 8/2015 | DeLay |
| 2015/0292677 A1 | 10/2015 | Curless et al. |
| 2016/0082910 A1 | 3/2016 | Sloan et al. |
| 2017/0045181 A1 * | 2/2017 | Watanabe ............... B29C 70/32 |
| 2017/0101003 A1 | 4/2017 | Zimmerman et al. |
| 2017/0282710 A1 * | 10/2017 | Sloan .................... F17C 13/084 |
| 2017/0307139 A1 | 10/2017 | Sinha et al. |
| 2018/0080607 A1 | 3/2018 | Van Haaren et al. |
| 2018/0093563 A1 | 4/2018 | Matijevich |
| 2018/0231182 A1 | 8/2018 | Posselt |
| 2018/0283609 A1 * | 10/2018 | Teruhira ................ B29C 53/602 |
| 2019/0077109 A1 | 3/2019 | Takemoto ................ B32B 5/02 |
| 2019/0111609 A1 * | 4/2019 | Van Nimwegen ...... B29C 70/24 |
| 2019/0170297 A1 * | 6/2019 | Criel ........................ F17C 1/06 |
| 2020/0072415 A1 | 3/2020 | Kamiya et al. |
| 2020/0088299 A1 | 3/2020 | Baumer et al. |
| 2020/0224823 A1 * | 7/2020 | Hatta ..................... B29C 63/08 |
| 2020/0271272 A1 | 8/2020 | Lee et al. |

(56) References Cited

U.S. PATENT DOCUMENTS

| | | | |
|---|---|---|---|
| 2020/0347992 | A1 | 11/2020 | Volkmer et al. |
| 2021/0088183 | A1 | 3/2021 | Middendorf |
| 2021/0123565 | A1 | 4/2021 | Kerforn et al. |
| 2021/0123568 | A1 | 4/2021 | Kronholz et al. |
| 2021/0138717 | A1 | 5/2021 | Iriyama |
| 2021/0310614 | A1* | 10/2021 | Kamiya ............... F16J 12/00 |
| 2022/0048380 | A1 | 2/2022 | Yordanov et al. |
| 2022/0178495 | A1 | 6/2022 | Volkmer et al. |
| 2022/0185089 | A1* | 6/2022 | Hendriks ............ H01M 16/006 |
| 2022/0196206 | A1* | 6/2022 | Furuzawa ................ F17C 1/06 |
| 2022/0203825 | A1 | 6/2022 | Volkmer et al. |
| 2022/0282834 | A1* | 9/2022 | Park ........................ F17C 1/00 |
| 2023/0358365 | A1 | 11/2023 | Yordanov et al. |
| 2023/0375132 | A1* | 11/2023 | Kato ........................ F17C 1/06 |
| 2023/0375133 | A1* | 11/2023 | Kai .......................... F17C 1/06 |
| 2024/0044452 | A1 | 2/2024 | Cederberg et al. |
| 2024/0198607 | A1 | 6/2024 | Beyens et al. |
| 2024/0240752 | A1* | 7/2024 | Grebner .................. F17C 1/06 |
| 2024/0263741 | A1 | 8/2024 | Hakamata |
| 2024/0271757 | A1 | 8/2024 | Volkmer et al. |
| 2024/0301997 | A1 | 9/2024 | Perrier |
| 2024/0367506 | A1* | 11/2024 | Andreas ............... B60K 15/063 |

FOREIGN PATENT DOCUMENTS

| | | |
|---|---|---|
| EP | 1 574 320 B1 | 10/2008 |
| EP | 3 587 087 A1 | 1/2021 |
| JP | 2010-265931 | 11/2010 |
| KR | 2014-0108345 | 9/2014 |
| WO | WO 2000/057102 A1 | 9/2000 |
| WO | WO 2007/110399 A2 | 10/2007 |
| WO | WO 2013/083662 | 6/2013 |
| WO | WO 2016/075100 | 5/2016 |
| WO | WO 2017/048154 | 3/2017 |
| WO | WO 2020/223666 A1 | 11/2020 |
| WO | WO 2022/235947 | 11/2022 |

OTHER PUBLICATIONS

U.S. Appl. No. 18/945,160, Composite Interwoven Gas Containment Assenblies, filed Nov. 12, 2024.

EHA Composite Machinery GmbH Brochure, in 10 pages.

JEC Connect, "The new machine concept for the large-scale pressure vessel", Jun. 2021, in 4 pages.

Roth Composite Machinery GMBH, "Press release—Aerospace: Roth Filament Winding Plant for the manufacture of Ariane 6 boosters", Jun. 26, 2018, in 7 pages.

* cited by examiner

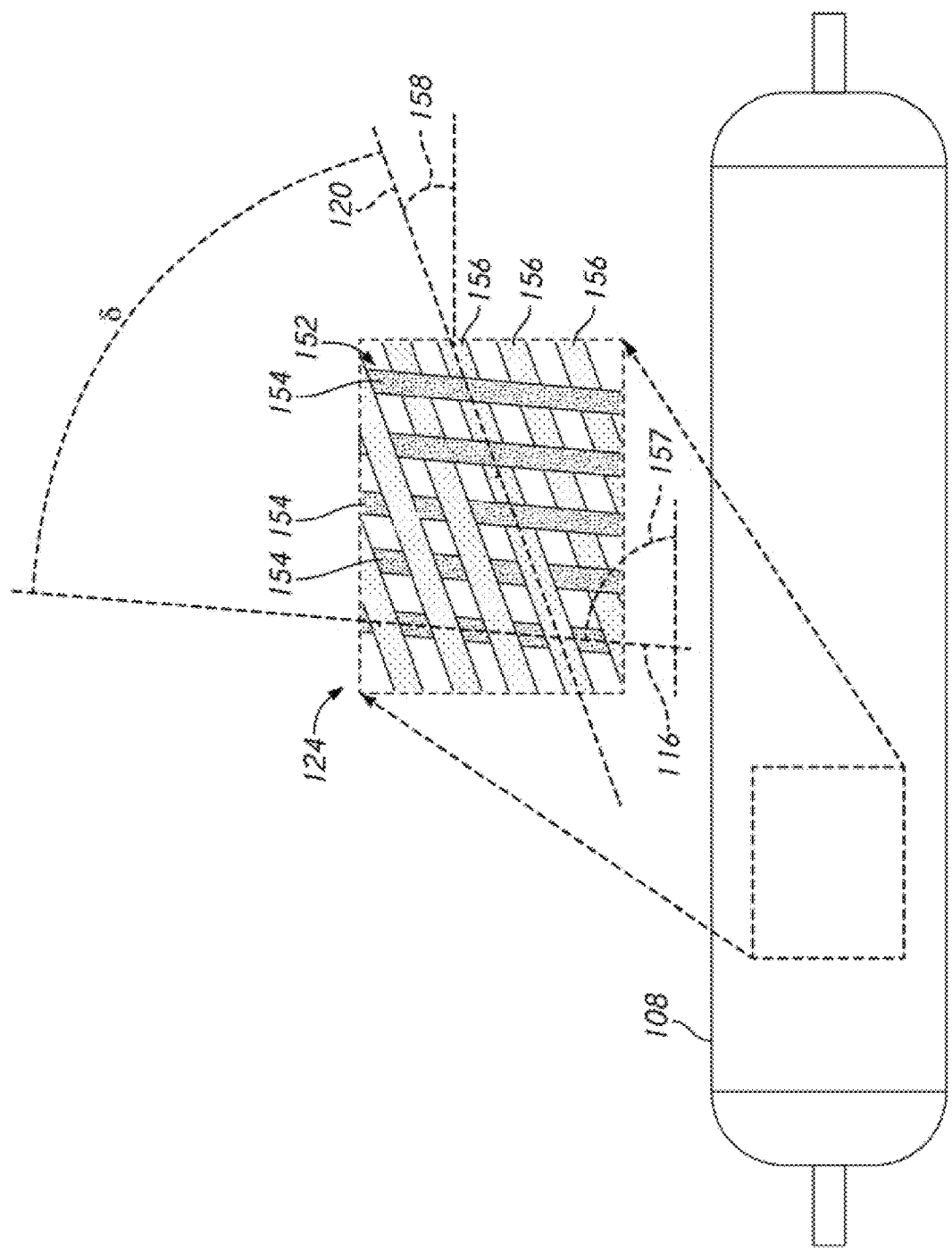

VEHICLES HAVING COMPOSITE INTERWOVEN GAS CONTAINMENT ASSEMBLIES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field

This disclosure relates to vehicles that utilize gas cylinder assemblies having a liner and reinforcement structure to provide a high pressure rating gas cylinder, a lower cost high durability gas cylinder, and/or other gas containment structures.

Description of the Related Art

Vehicles can utilize gas cylinders that can be configured as pressure vessels and as fuel tanks for compressed natural gas (CNG) and can be used to store hydrogen in transportation applications. For example, vehicles may include one or more pressure vessels and/or tanks used to contain fuel for powering the vehicle and/or pressurized air for powering an auxiliary system such as vehicle brake. Such tanks may be categorized into four different types. Type 3 and Type 4 tanks designs employ metal and polymer liners, respectively, and a fiber reinforcement. The fiber reinforcement includes filament wrapped layers to provide the structural reinforcement. Unlike other tank types, a Type 4 tank is not subject to corrosion, is lighter per unit volume stored, and costs less to fabricate.

Wrapping fiber reinforced filaments over a liner is a complex process. When the tank is pressurized, the load in the radial direction is much greater than the load in the axial direction. As a result, the fiber must provide reinforcement in the radial direction that is greater than that provided in the axial direction. The difference in reinforcement is achieved by providing one winding pattern of the fiber in the central cylindrical section of the tank and a different winding pattern over domed ends of the tank.

To provide these winding patterns, conventional tank processing involves transitioning from a central section winding pattern to a domed end winding pattern. In one technique the transition is achieved by cutting the fiber filaments being wound for radial reinforcement at the end of the central section. Then, an end section pattern winding can be started by connecting a free end of fiber filament to the tank, reorienting the fiber filament, and then winding the end pattern about the tank. This approach is impractical in mass production. In another technique, the transition is achieved by, within the limits of friction, slowly steering the fiber angle from a high angle in the central section to a lower angle in the end section pattern. However, this approach involves winding more material than structurally necessary, which adds weight, thickness/diameter, wind time, and cost.

SUMMARY

Improvements in fiber winding techniques in the production of gas cylinders, such as pressure vessels and fuel tanks, and other gas containment assemblies including pipes are needed to provide practical, production volume ready processes and to reduce product compromises. These product compromises can arise due to the limitations of winding pattern transitions. Improvements can be achieved by simultaneously winding hoop strands and helical strands to achieve an interwoven structure. This approach can provide improved reinforcement per unit weight using a same or different material for hoop strands and helical strands.

In one example, a vehicle can include a cab, a plurality of wheels, one or more frame rails, an engine or power generation system, and a pressure vessel. The one or more frame rails are configured to support the cab and the plurality of wheels. The engine or power generation system are configured to be powered by a fuel. The pressure vessel is configured to store the fuel to be used by the engine or power generation system. The pressure vessel includes a structural shell formed by filament winding upon a substantially cylindrical form. The structural shell includes a first filament comprising a first material composition wound about the substantially cylindrical form in a first primarily hoop direction (e.g., corresponding to angles between 60-90, 70-90, or 80-90 degrees) and a second filament comprising a second material composition that is different from the first material composition, the second filament wound about the substantially cylindrical form in a second primarily hoop direction (e.g., corresponding to angles between 60-90, 70-90, or 80-90 degrees). The first filament and the second filament are interwoven in a layer upon the substantially cylindrical form.

In some embodiments, the first material composition includes carbon fiber. In some embodiments, the second material composition includes glass fiber. In some embodiments, the layer includes a continuous expanse from an outer surface of the substantially cylindrical form to the outer surface of the pressure vessel without layer boundaries therebetween. In some embodiments, the layer includes a three dimensional interwoven construct. In some embodiments, the layer includes a first hoop filament and a second hoop filament crossing over each other at a first angle in a first portion of the three dimensional interwoven construct, the first hoop filament and the second hoop filament crossing over each other at a second angle in a second portion of the three dimensional interwoven construct.

In another example, a system includes at least one of an engine, a power generation system, or an auxiliary vehicle system and a housing. The at least one of an engine, power generation system, or an auxiliary vehicle system is configured to be powered by a pressurized fluid. The housing is configured to couple to one or more frame rails of a vehicle and receive and protect a pressure vessel configured to store the pressurized fluid to be used by the at least one of an engine, a power generation system, or an auxiliary vehicle system. The pressure vessel includes a liner and a structural shell. The structural shell includes a first filament wound about the liner in a first primarily hoop direction (e.g., corresponding to angles between 60-90, 70-90, or 80-90 degrees) and a second filament wound about the liner in a second primarily hoop direction (e.g., corresponding to angles between 60-90, 70-90, or 80-90 degrees). The first filament and the second filament are interwoven in a layer around the cylindrical center portion of the liner.

In some embodiments, the system includes a portion of at least one of the first filament and the second filament wound about the liner in a primarily helical direction around the two domed portions of the liner. In some embodiments, a material composition of a material of the first filament includes carbon fiber. In some embodiments, a material composition of a material of the second filament includes glass fiber. In some embodiments, the layer includes a continuous expanse from an outer surface of the liner to the outer surface of the pressure vessel without layer boundaries therebetween. In some embodiments, the layer includes a three dimensional interwoven construct. In some embodiments, the layer includes a first hoop filament and a second hoop filament crossing over each other at a first angle in a first portion of the three dimensional interwoven construct, the first hoop filament and the second hoop filament crossing over each other at a second angle in a second portion of the three dimensional interwoven construct.

In another example, a system includes a pressure vessel configured to contain a pressurized fluid for powering at least one of an engine, a power generation system, or an auxiliary system. The pressure vessel comprises a substantially cylindrical liner, a first filament, and a second filament. The first filament is wound about the substantially cylindrical liner in a first primarily hoop direction (e.g., corresponding to angles between 60-90, 70-90, or 80-90 degrees). The second filament is wound about the substantially cylindrical liner in a second primarily hoop direction (e.g., corresponding to angles between 60-90, 70-90, or 80-90 degrees). The first filament and second filament are woven upon the substantially cylindrical liner such that a first portion of the first filament is disposed over the second filament and a second portion of the first filament is disposed under the second filament.

In some embodiments, the pressure vessel includes a portion of at least one of the first filament and the second filament wound about the substantially cylindrical liner in a primarily helical direction. In some embodiments, the first filament includes a first material and the second filament includes a second material that is different from the first material. In some embodiments, the first material includes a carbon fiber. In some embodiments, the second material includes a glass fiber. In some embodiments, the first filament and the second filament are wound in a three dimensional interwoven layer comprising a continuous expanse from an outer surface of the substantially cylindrical liner to the outer surface of the pressure vessel without layer boundaries therebetween. In some embodiments, the three dimensional interwoven layer includes a first hoop filament and a second hoop filament crossing over each other at a first angle in a first portion of the three dimensional interwoven layer, the first hoop filament and the second hoop filament crossing over each other at a second angle in a second portion of the three dimensional interwoven layer. In some embodiments, the first filament and the second filament are each configured with about the same strength along a longitudinal axis thereof.

In some applications, a winding apparatus can be provided that allows independent application of hoop strands and helical strands to facilitate interweaving. Preferably the winding apparatus can facilitate simultaneously winding with different materials and/or different compositions of a material to provide an interwoven structure with more strength where needed and less excess fiber where lower strength is sufficient.

In one example, a gas containment assembly, such as a pipe or pressure vessel, can include a liner reinforced by a single three dimensional interwoven layer. The inner surface of the single three dimensional interwoven layer can be in direct contact with the outside surface of the liner. The outer surface of the single three dimensional interwoven layer can form an outer surface of the fully formed tank. In some cases, the outer surface of the fully formed tank is also painted or otherwise finished but in such cases no additional structural layer is needed.

A method of interweaving primarily hoop strands and primarily helical strands can provide a composite structure without any discrete boundaries between discrete layers formed of different stiffness materials or of different stiffness compositions of materials. Such a structure is believed to be much more durable than a layered structure with respect to delamination and/or at certain angles of impact or direction of impact forces.

In another embodiment a method is provided in which a form (e.g., a metal or polymeric liner, a pipe liner, a mandral, and/or a removable form) is mounted to a spindle. The form is rotated using the spindle. While the form is rotating, a first filament of a first material is wound in a primarily hoop direction. While the first filament is wound, simultaneously winding a second filament in a primarily helical direction. The simultaneously winding of the first filament and the second filament provides an interwoven structure disposed about and reinforcing the form. If the form is a liner, the form can be integrated into the finished product, e.g., into a pressure vessel or pipe assembly. In some methods, the form is removable such that the inner layer of the filaments forms a free surface, e.g., the inside, of the structure.

In some methods, winding of the first and second filaments is controlled independently by a first carriage having a first eye in a first configuration (e.g., angle relative to a meridian of the liner) and a second carriage having a second eye in a second configuration (e.g., angle relative to a meridian of the liner). The first and second carriages can be controlled to proceed through multiple passes over the liner or other form creating a three dimensional structure that is interwoven in each pass and without discrete strain boundary layers portion of the reinforcement layer applied by subsequent passes.

In some methods, winding the first filament and simultaneously winding the second filament is performed with at least one of the first filament and the second filament being continuous, e.g., from an inner boundary of a complete reinforcement structure to an outer boundary of the complete reinforcement structure. As used herein a complete reinforcement structure is one that is strong enough for the application and need not include surface finish, paint or other layers outside the reinforcement structure.

In some methods, winding the first filament comprises adjusting a first eye of a winding apparatus over a first range of angles relative to a meridian of the liner (or more generally the form) and simultaneously winding the second filament comprises adjusting a second eye of the winding apparatus over a second range of angles relative to the meridian of the liner (or more generally the form). In some approaches, the first range of angles do not overlap the second range of angles. The first range of angles can correspond to a primarily hoop direction and the second range of angles correspond to a primarily helical direction. The first range of angles can be between about 80 degrees and about 100 degrees. The second range of angles can be between about 20 degrees and about −20 degrees.

In one embodiment, a pressure vessel or more generally a gas containment assembly such as a pipe is provided that has a structural shell formed by filament winding upon a substantially cylindrical form. The form can be a lightweight, e.g., polymeric, liner in some embodiments. The form can be a metal liner in some embodiments. The form can be removable in some embodiments. The structural shell has a first filament and a second filament. The first filament includes of a first material. The first filament is wound about the form in a primarily hoop direction. The second filament includes a second material. The second material is different from the first material. The second filament is wound about the form in a primarily helical direction. The first filament and second filament are interwoven in a layer upon the form.

In another embodiment, a pressure vessel or more generally a gas containment assembly such as a pipe assembly is provided that includes a substantially cylindrical form (e.g., a polymeric liner, a lightweight liner, a lightweight polymeric liner, a metal liner, a pipe liner, a mandral, and/or a removable form), a first filament, and a second filament. The first filament is wound about the form in a primarily hoop direction. The second filament is wound about the form in a primarily helical direction. The first filament and second filament are woven upon the form such that a first portion of the first filament is disposed over the second filament and a second portion of the first filament is disposed under the second filament. As used herein, one filament is under the other if a length thereof is between the other filament and the liner in a radial direction of the pressure vessel.

The first filament and the second filament can be a same material. If the first and second filaments are of the same material, the composition of the first and second filament can be the same. The first and second filament can be of the same material, but the first and second filaments can have different material properties. For example, the first filament and the second filament can comprise the same material but the first filament can be configured with greater strength. The first and second filament can comprise different materials, e.g., carbon reinforced filament and glass reinforced filament.

BRIEF DESCRIPTION OF THE DRAWINGS

Features of the invention can be better understood from the following detailed description when read in conjunction with the accompanying schematic drawings, which are for illustrative purposes only. The drawings include the following figures:

FIG. 11C is a schematic view of the gas cylinder seen in FIG. 9 with another portion of a woven structure shown in detail;

DETAILED DESCRIPTION

Figure 1:
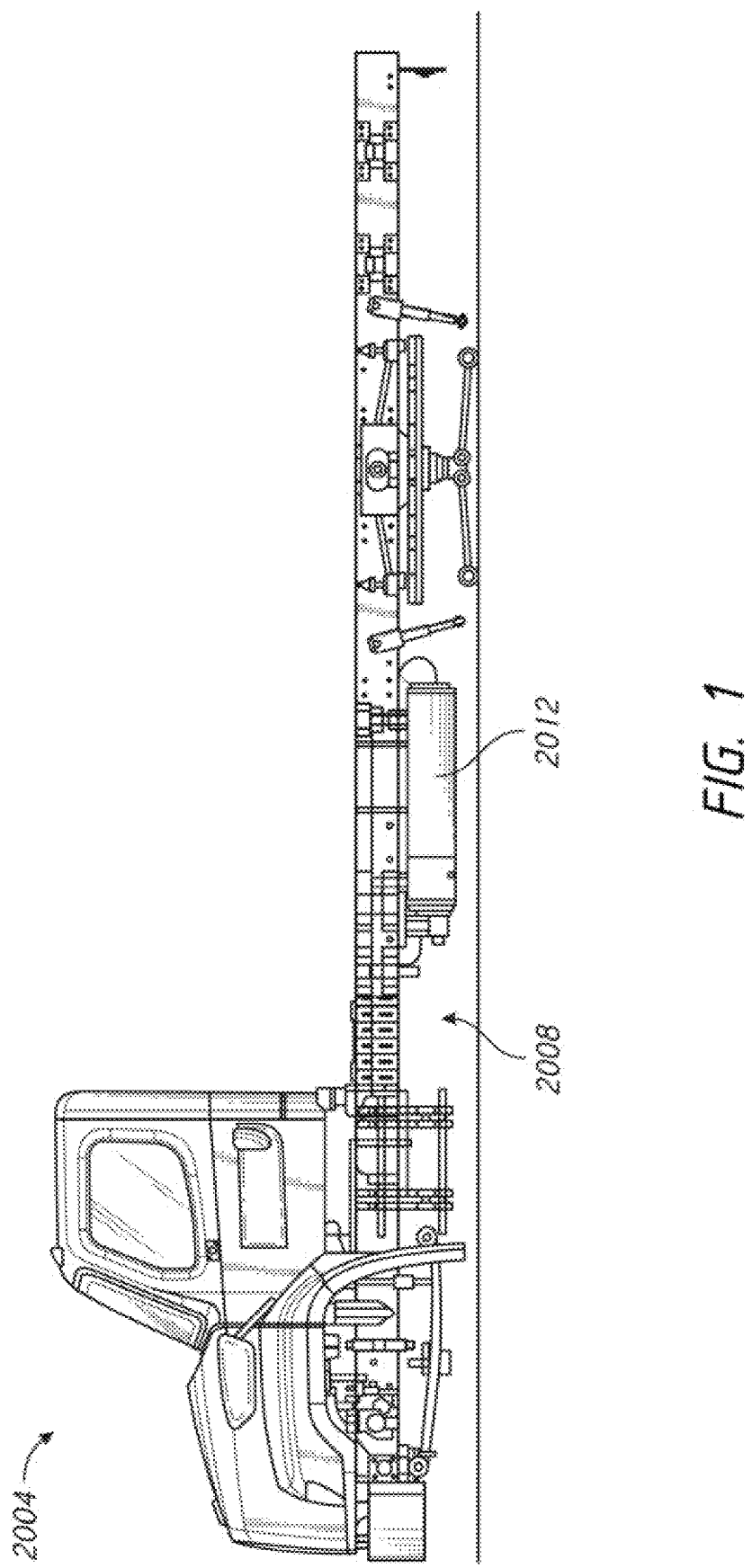
FIG. 1 shows a portion of a heavy duty truck illustrating a conventional location for a compressed air vessel.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses vehicles that utilize novel gas cylinders and methods of and apparatuses for producing the same. As used herein "cylinder" is a term that includes storage tanks, pressure vessels, and other containers that can be used to store a gas and is not necessarily limited to a specific shape such as a right cylinder and/or having a constant or unvarying circular shape in cross-section. The novel apparatuses and methods produce an interwoven structure of first fibers wound in a first direction with second fibers wound in a second direction. The winding process yields a three dimensional structure of interwoven fibers which avoids discrete boundary layers, particularly boundary layers in stiffness, within the structure. The three dimensional structure of interwoven fibers can be formed continuously, e.g., by continuous strands of fibers, avoiding cutting fibers or dwelling to transition between layers. By eliminating such boundary layers, the reinforcement structure avoids certain failure modes while at the same time achieving high pressure ratings in some embodiments, high durability in some embodiments, and both high pressure ratings and high durability in some embodiments.

Vehicle Fluid Handling Systems

FIGS. 1-8, discussed below, illustrate a variety of embodiments of vehicles, fuel systems, and auxiliary fluid vessels, among other things. The disclosed fuel systems and/or auxiliary fluid vessels can be mounted in various locations and/or arrangements, including below the chassis (e.g., FIG. 1) behind-the-cab (e.g., FIGS. 2-7), roof mounted, tailgate mounted, side mounted, and/or the like. Example roof mounted, tailgate mounted, and side mounted arrangements that could be used with and/or adapted for use with the techniques disclosed herein are shown in U.S. Pat. No. 11,312,229 ("'229 Patent"), titled FUEL SYSTEM MOUNTABLE TO A VEHICLE FRAME and issued on Apr. 26, 2022, the entire contents of which is incorporated by reference herein for all purposes and forms a part of this specification. For example, roof mounted arrangements are shown in FIGS. 42 and 43 of the '229 Patent, tailgate mounted arrangements are shown in FIGS. 44 and 45, and side mounted arrangements are shown in FIGS. 46 and 47.

Further, the fuel systems and/or auxiliary fluid vessels discussed below with reference to FIGS. 1-8 may comprise various embodiments of gas cylinder assemblies, including, for example, the various embodiments of gas cylinder assemblies discussed below with reference to FIGS. 9-12. For example, any of the fuel tanks or pressure vessels (or portions thereof) visible in FIGS. 1-8 may comprise any of the gas cylinder assemblies discussed below with reference to FIGS. 9-12 and/or may be manufactured using any of the manufacturing techniques discussed below with reference to FIGS. 9-12.

Additionally, although various embodiments discussed below with reference to FIGS. 1-8 include both of (1) one or more fuel tanks (e.g., a gas cylinder intended to contain fuel for powering the vehicle) and (2) one or more auxiliary pressure vessels (e.g., a gas cylinder intended to contain pressurized air for powering an auxiliary system such as vehicle brakes), the disclosure is not limited to such embodiments. For example, any of the mounting arrangements discussed below with reference to FIGS. 1-8 (such as below the chassis, behind-the-cab, roof mounted, tailgate mounted, side mounted, and/or the like) may include or be modified to include: (1) only one or more fuel tanks, without any auxiliary pressure vessels, (2) only one or more auxiliary pressure vessels, without any fuel tanks, or (3) both of one or more fuel tanks and one or more auxiliary pressure vessels. In any of these embodiments, either or both of the fuel tanks or auxiliary pressure vessels may be constructed using various construction techniques, including but not limited to, the gas cylinder construction techniques discussed below, with reference to FIGS. 9-12.

FIG. 1 shows a conventional location for mounting a pressure vessel 2012 for a braking system to a lower portion 2008 of a chassis 2004 of a vehicle. The chassis 2004 mechanically supports the pressure vessel 2012, as well as the wheels and other components of a vehicle. The location shown is below the chassis 2004, between the forward wheels of the cab and the rear wheels of the semi-trailer. The pressure vessel 2012 can be supported by brackets or straps and supplies a fluid that is used to actuate the brakes to slow down the rotation of the wheels. The location shown is satisfactory if the space between the wheels is sufficient but leaves the pressure vessel 2012 exposed to damage by rocks or debris from the wheels or road.

Behind-the-Cab Systems

Figure 2:
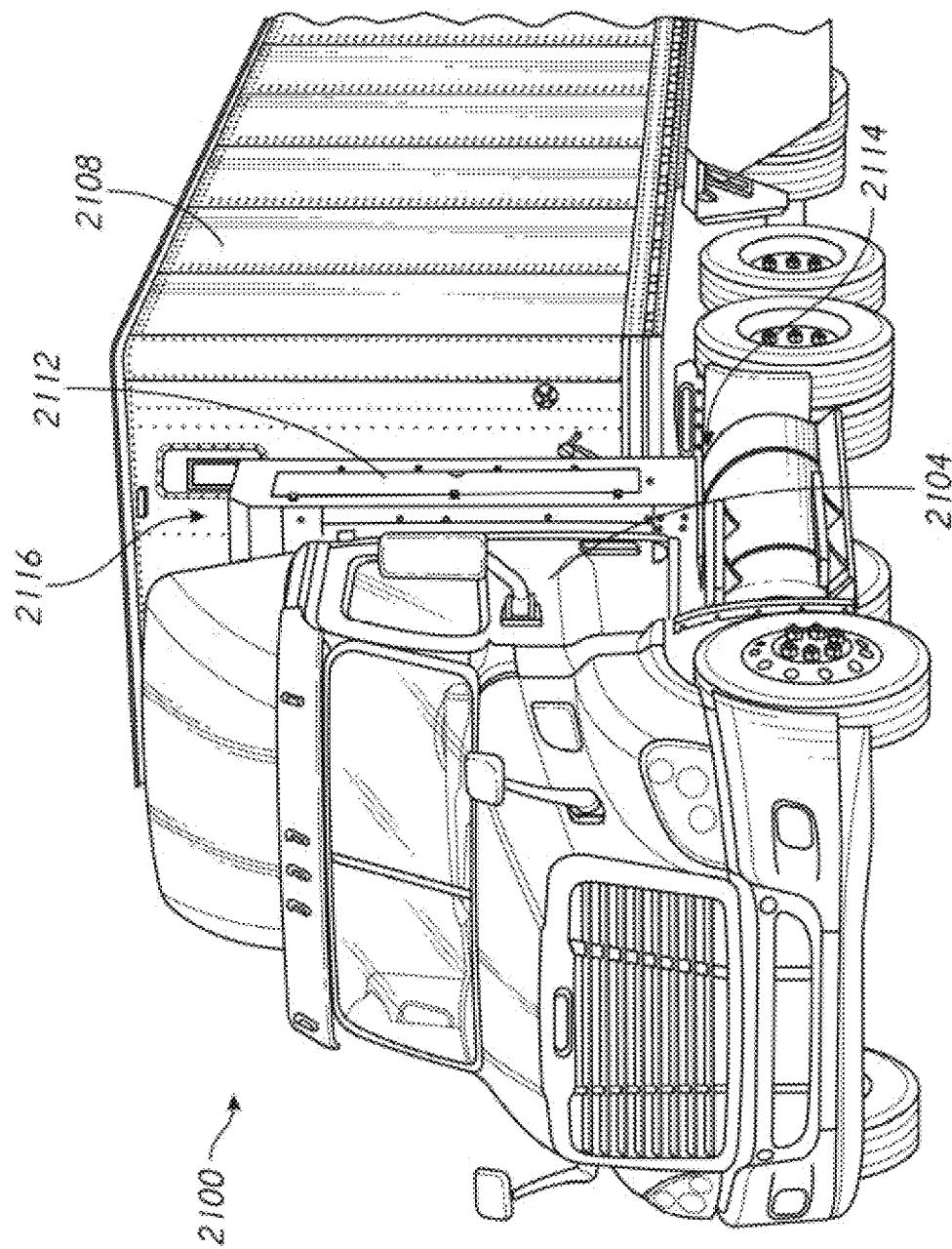
FIG. 2 is a perspective view of a heavy duty truck with a fluid storage system according to one embodiment of this application disposed behind the cab thereof.

FIG. 2 shows a vehicle 2100 that can benefit from a fluid system 2116 as claimed herein. The vehicle 2100 is a heavy duty truck capable of long range hauling, but it could be other heavy duty vehicles as discussed below. The vehicle 2100 includes a tractor unit having a cab 2104 and a semi-trailer 2108. A cowling 2112 of the fluid system 2116 can be seen disposed between the cab 2104 and the semi-trailer 2108. The system 2116 is mounted to a chassis 2114 of the vehicle 2100. The cowling 2112 encloses a number of components of the fluid system 2116 including a fuel pressure vessel 2118 and an auxiliary fluid vessel 2120 as discussed further below. The auxiliary fluid vessel 2120 preferably is able to store a working fluid at elevated pressure. In one application the vessel 2120 has a capacity of 1740 cubic inches. In another embodiment, the vessel has a capacity of about 2030 cubic inches. By integrating the auxiliary fluid vessel 2120 and the fuel pressure vessel 2118 into the fluid handling system 2116 the overall system integration of the vehicle 2100 can be greatly improved as explained further below. These advantages also apply to fuel systems that are mounted in different locations on a vehicle as discussed below.

Figure 3:
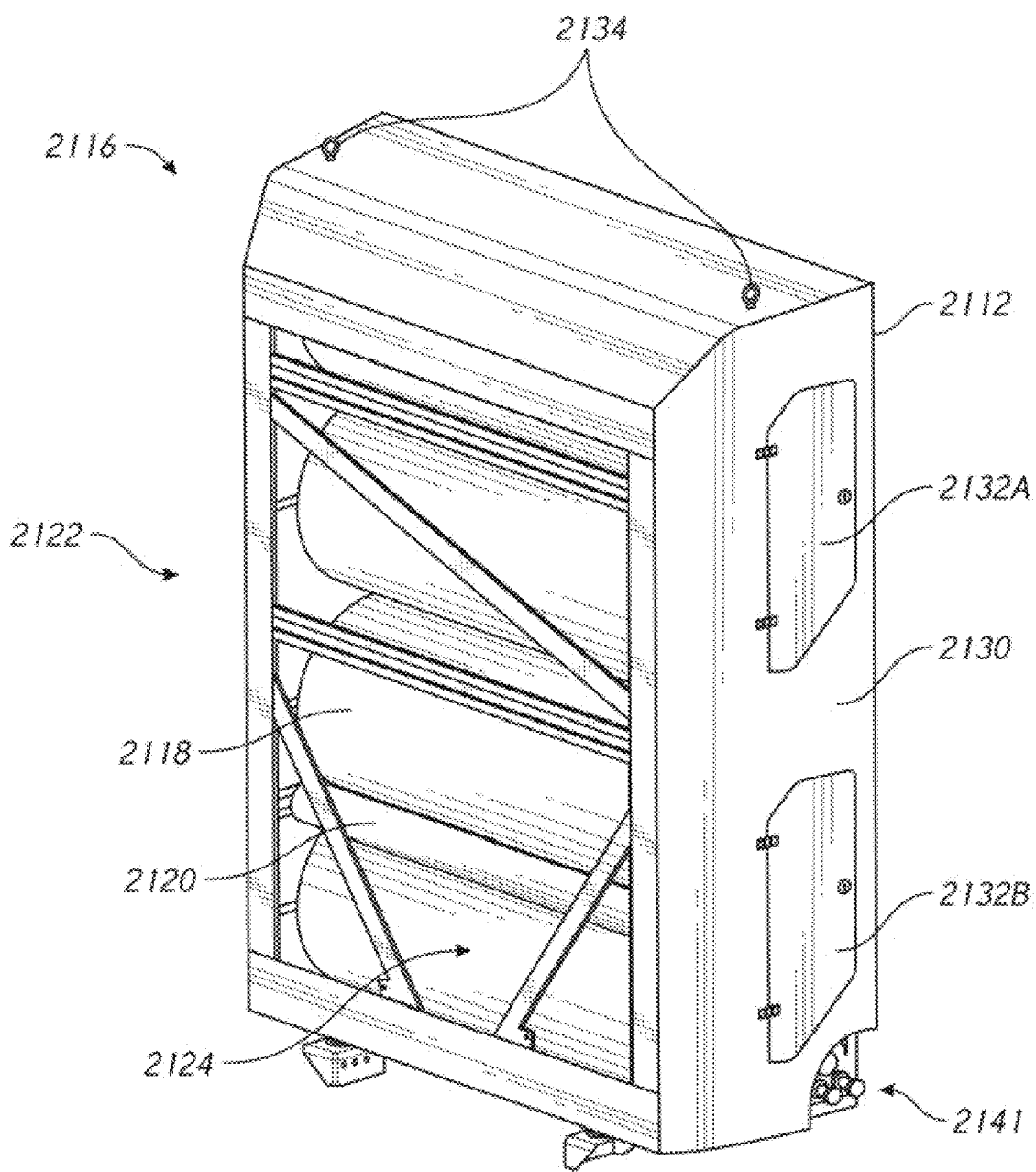
FIG. 3 is a front perspective view of a fluid storage system that can be mounted in a space behind a cab of a heavy duty truck as depicted in FIG. 2.
Figure 4:
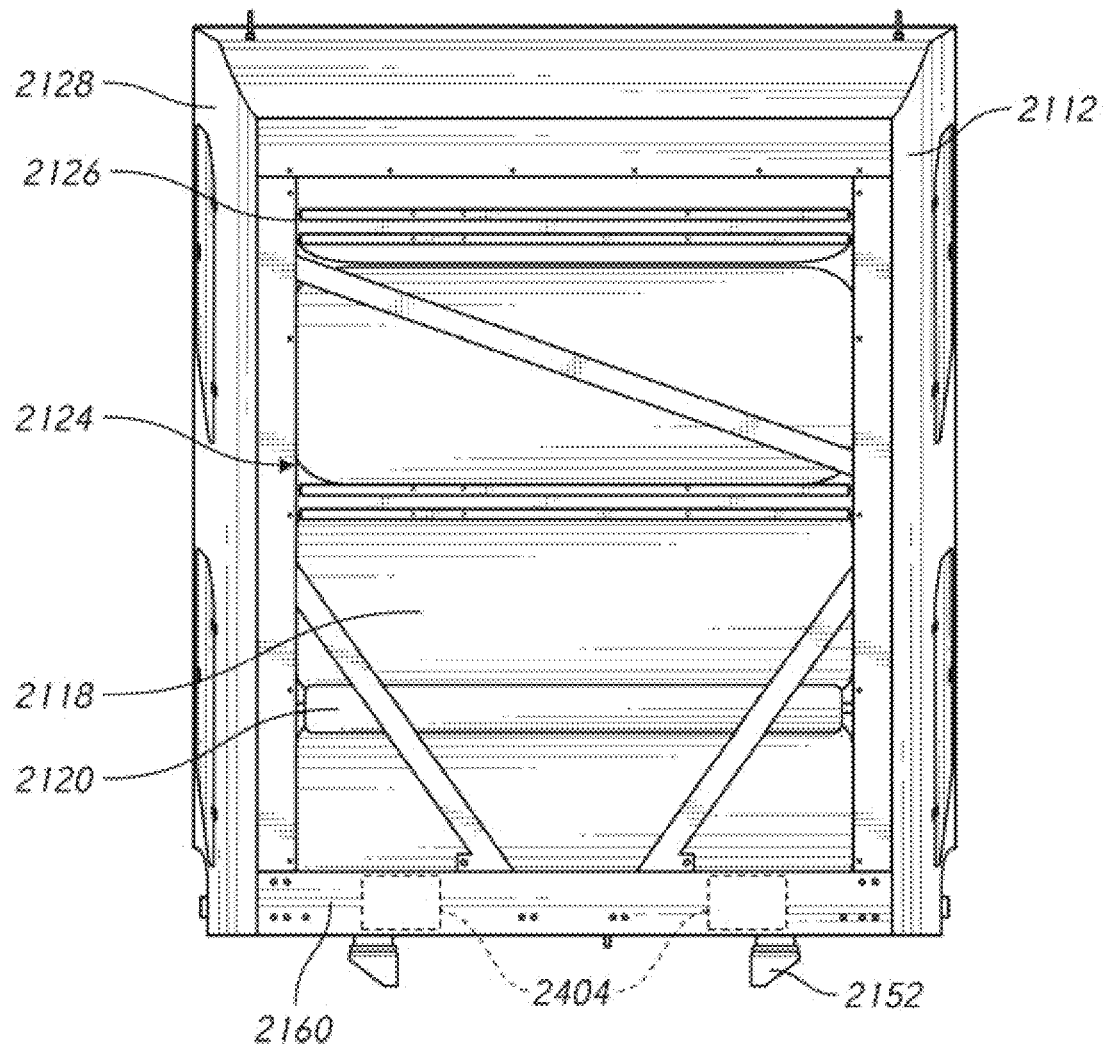
FIG. 4 is a front plan view of the fluid storage system of FIG. 3.

FIGS. 3 and 4 show certain components of the fluid system 2116 in more detail. A front portion 2122 includes one or more openings 2124 through which internal components of the fluid system 2116 are exposed. The opening 2124 can be bounded by an inner periphery 2126 of the cowling on the front portion 2122. The opening 2124 can be segmented between portions of a frame assembly of the fluid system 2116. In the illustrated embodiment, the fluid vessel 2120 is accessible through the opening 2124 so that the vessel can be inspected, serviced, and/or replaced as needed. In a behind the cab configuration the cab 2104 covers the opening 2124 to limit access to the components through the opening 2124 when the fluid system 2116 is mounted to the vehicle 2100. This improves upon existing practice by placing the auxiliary fluid vessel 2120 in an enclosed space. By leaving access through the opening 2124 that is blocked by the cab 2104, the fluid system 2116 provides a good combination of ease of access with protection of the vessel 2120. The opening 2124 also enables the fluid handling system 2116 to be lighter than if the cowling 2112 fully surrounded the fluid system 2116 on all side. In some applications, the opening 2124 is eliminated and the cowling 2112 fully surrounds the internal components of the fluid system 2116.

The cab 2104 controls flow of air around a front portion of the vehicle 2100 preventing the openings 2124 from increasing drag significantly. The cowling 2112 includes a forward portion 2128 that extends from the inner periphery 2126 to an outer periphery 2130 of the fluid storage system 2116. The forward portion 2128 may extend laterally of the cab 2104 to some extent in some applications. The forward portion 2128 may be shaped to reduce a drag contribution by the fluid handling systems 2116 in such configurations. For example, the forward portion 2128 can be inclined in a rearward direction as shown in FIG. 3 at the top or lateral edges. The system 2116 improves on existing practice by disposing the auxiliary fluid vessel out of the air stream to provide aerodynamic benefits resulting in continuous fuel savings.

The cowling 2112 can have access panels for enabling user and maintenance access to the enclosed space therein. For example, one lateral side of the outer periphery 2130 can have a plurality of access panels, e.g., an upper panel 2132A and a lower panel 2132B. One of the panels, e.g., the upper panel 2132A, can be primarily for accessing the fuel pressure vessel 2118. One of the panels, e.g., the lower panel 2132b, can provide access to an end of the auxiliary fluid vessel 2120. The access panels 2132A, 2132B also can provide access to controllers, fluid ports, and other features of the fluid system 2116, as discussed further in connection with FIG. 5. The access panels 2132A, 2132B also can provide access to controllers, fluid ports, and other features of an auxiliary fluid system, as discussed further below. Access to the auxiliary fluid vessel 2120 and a fluid system coupled therewith through the panel 2132B allows service of and/or a change in configuration of auxiliary systems that are powered by the fluid in the auxiliary fluid vessel 2120.

The fluid system 2116 can also have one or a plurality of handling members 2134 accessible on an outside surface of the cowling 2112. The handling members 2134 can include one or a plurality of hooks or eye-bolts. The handling members 2134 preferably are on a top side of the system 2100, such that the system 2100 can be suspended by cables or other tension members and lowered thereby into position. Other handling members 2134 can be provided. The handling members 2134 enable the fluid system 2116 to be hoisted onto the vehicle 2100 or removed therefrom for repair, reconditioning or replacement. For example, as discussed above, the auxiliary fluid vessels 2120 are accessible through the opening 2124. By lifting the system 2116 using the handling members 2134, the vessel 2120 can be inspected, serviced and repaired. The handling members 2134 are advantageous for applications where the fluid system 2116 is retrofitted to the vehicle 2100. The handling members 2134 can be used in original assembly of the vehicle 2100 as well.

FIGS. 3-6 show different aspects of a frame assembly 2140 of the fluid storage system 2116. The frame assembly 2140 is at least partially disposed within the cowling 2112. In the illustrated embodiment, the frame assembly 2140 is entirely enclosed within the cowling 2112 other than an exposed portion 2141 coupled with an exposed connection panel. The frame assembly 2140 has a lower portion 2144 and an upper portion 2148. The fuel storage system 2116 is configured to be mounted to or to couple with a chassis 2114 of the vehicle 2100. The fuel storage system 2116 can be couple with the chassis 2114 at or below the lower portion 2144. For example, the lower portion 2144 can have one or a plurality of brackets 2152 that are configured to couple the frame assembly 2140 with the chassis 2114 of the vehicle 2100. The fluid system 2116 can be lowered by a hoist coupled with the handling members 2134 on the chassis 2114 until one face of each of the brackets 2152 is aligned with a mounting portion of the chassis. Thereafter, the brackets 2152 can be secured to the chassis 2114.

Figure 5:
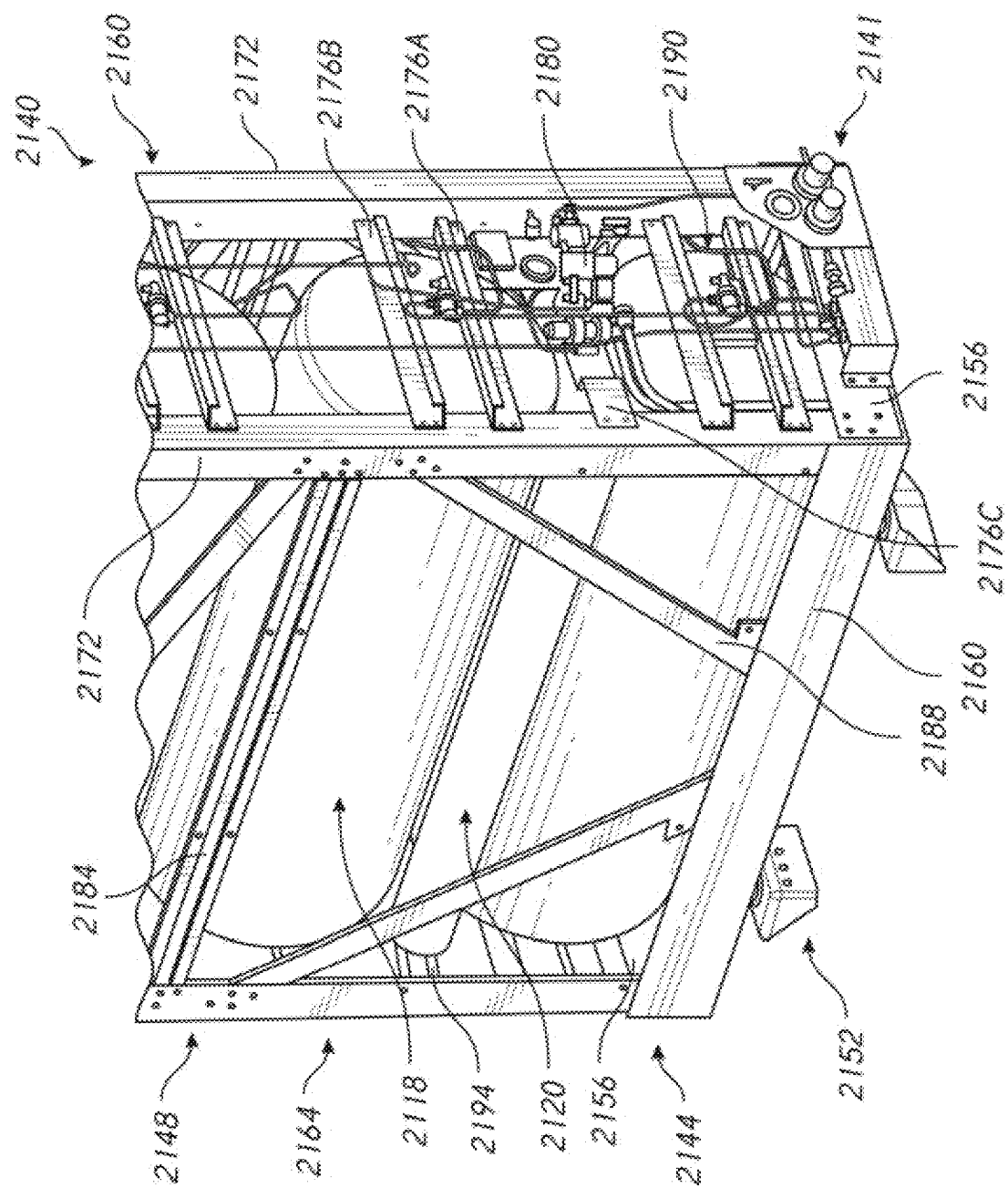
FIG. 5 is a detail front perspective view of the fluid storage system of FIG. 3 with the cowling thereof removed for enhanced clarity of view of the internal components of the system.
Figure 6:
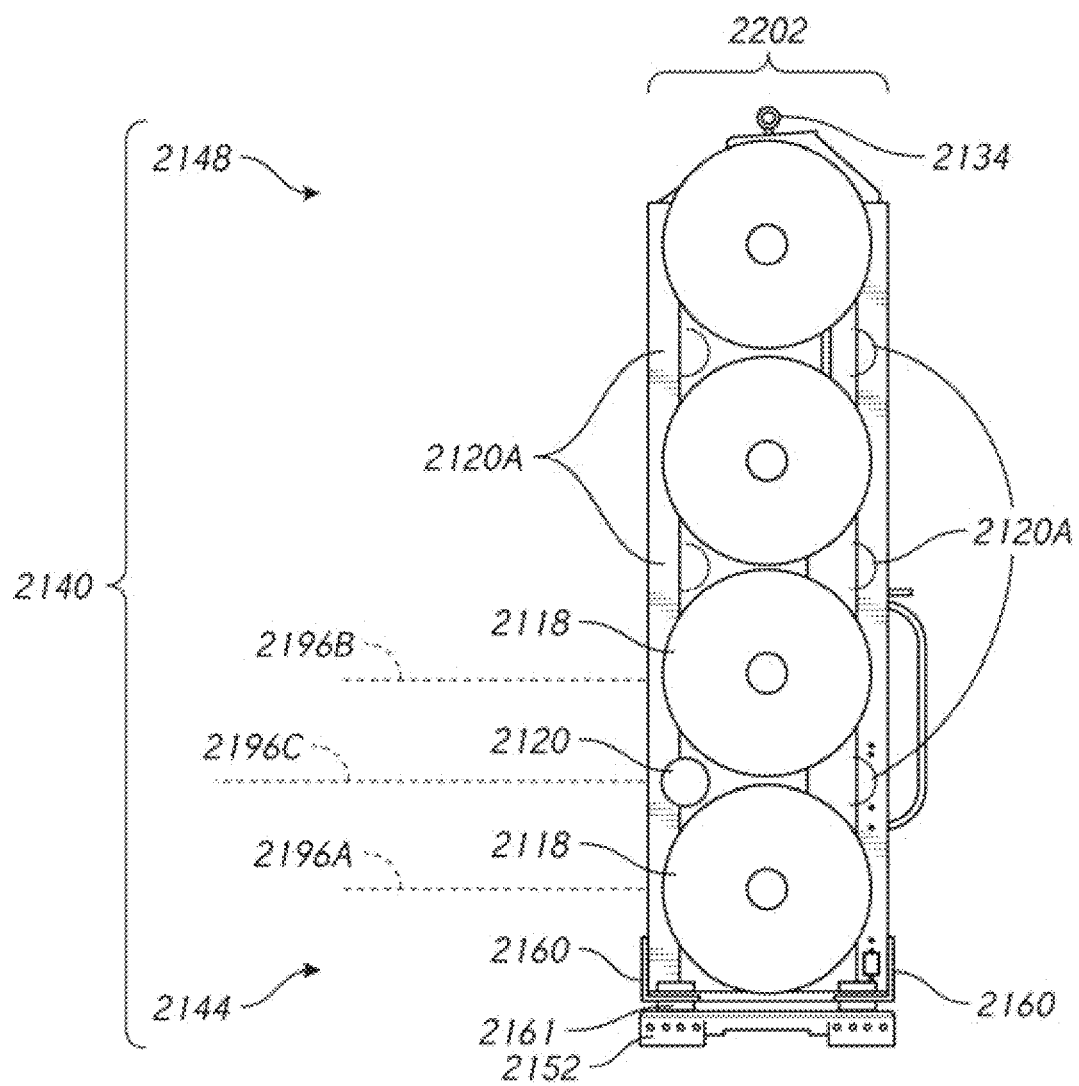
FIG. 6 is side view of the fluid storage system of FIG. 3 with the cowling thereof removed showing a number of auxiliary fluid pressure vessel support locations.

FIG. 5 shows an embodiment in which the lower portion 2144 includes first and second lateral members 2156 and first and second traverse members 2160. One of the lateral members 2156 is disposed on aside of the frame assembly 2140 corresponding to the driver side of the vehicle 2100, e.g., in a position below components accessible through the panels 2132A, 2132B. Another lateral member 2156 is disposed on the opposite lateral side of the frame assembly 2140. FIG. 6 shows the transverse members 2160. The lateral ends of the transverse members 2160 are coupled with the first and second lateral members 2156. In the illustrated embodiment the lateral members 2156 comprise a plate-like structure and the transverse members 2160 comprise L-brackets. A damper 2161 (see FIG. 6) can be disposed between the transverse members 2160 and the brackets 2152 to isolate the fluid system 2116 from vibration and shock from the road, at least to some extent. The brackets 2152 can be assembled to the transverse members 2160 and thus can be part of the lower portion 2144 of the frame assembly 2140 in some embodiments. In other embodiments, the brackets 2152 can be part of a standard chassis component to which the lower portion 2144 of the frame assembly 2140 is to be coupled.

The upper portion 2148 of the frame assembly 2140 can have any suitable configuration. For example, the upper portion 2148 can have first and second upright frames 2160, 2164. The first and second upright frames 2160, 2164 are disposed on opposite lateral sides of the frame assembly 2140. The lateral member 2156 disposed beneath the components accessible through the panels 2132A, 2132B can be coupled with or can be a lower portion of the first upright frame 2160. The lateral member 2156 disposed opposite these components can be coupled with or can be a lower portion of the second upright frame 2164. The first and second upright frames 2160, 2164 are located such that when the fluid system 2116 is mounted to the chassis 2114 the first upright frame 2160 is on the driver side of the vehicle and the second upright frame 2164 is on the passenger side of the vehicle. The opposite placement is also possible. In one embodiment, one of the frame members 2160, 2164 supports components of a fluid system including the auxiliary fluid vessel 2120 in a manner allowing access thereto through the panels 2132A, 2132B or at the exposed portion 2141.

The upright frames 2160, 2164 preferably include mounting features for creating a space to position the auxiliary fluid vessel 2120 and for supporting various components. For example, the upright frames 2160, 2164 can include a plurality of elongate members 2172 that have lower ends coupled with the lower portion 2144 of the frame assembly 2140 and upper ends disposed way from the lower ends. The elongate members 2172 can be L-brackets in one embodiment. The elongate members 2172 can partially define the perimeter of a space for disposing and, in some embodiments, enclosing the auxiliary fluid vessel 2120. A plurality of lateral members 2176 can be coupled to elongate members 2172. The lateral members 2176 can have forward ends coupled with a forward elongate member 2172 and rearward ends coupled with a rearward elongate member 2172.

In one configuration the lateral members 2176 provide one or both of structural reinforcement and component supporting functions to the upright frames 2160, 2164 and to the frame assembly 2140. FIG. 5 shows another configuration in which at least some of the lateral members 2176 provide multiple functions. A first lateral member 2176A comprises a C-shaped configuration in which a first side is coupled with lateral surfaces of the forward and rearward elongate members 2172. The C-shaped lateral member 2176A provides a second side adjacent to the first side. The second side can have a horizontal surface extending laterally from the first side. The horizontal surface can support the fuel pressure vessel 2120 as discussed further below. The C-shaped lateral member 2176A provides a third side adjacent to the second side. The third side can be configured to couple with a portion of a fluid manifold as discussed further below. A second lateral member 2176B can be provided in some embodiments. The second lateral member 2176B can have a configuration similar to that of the first lateral member 2176A, e.g., a C-shaped configuration. In one arrangement, the second lateral member 2176B is inverted compared to the first lateral member 2176A. The second lateral member 2176B can have a horizontal surface adjacent to a lower end of a first side of the member 2176B. The horizontal surface of the second lateral member 2176B can extend laterally of the first side of the second lateral member 2176B. The horizontal surface of the second member 2176B can be positioned to face a horizontal surface of the first lateral member 2176A. The horizontal surfaces of the first and second lateral members 2176A, 2176B can support pressure vessels directly or indirectly as discussed further below. Although shown supporting the fuel pressure vessel 2118 a pair of support members similar in structure to the members 2176A, 2176B could be provided to support the auxiliary fluid vessel 2120.

A third member 2176C can be configured for supporting fluid manifold components 2180. The fluid manifold components 2180 can include regulators, pressure relief devices, or other components of a state of the art fuel system in one embodiment. The fluid manifold components 2180 can include conduit, couplers or fluid line junctions for auxiliary fluid systems in another embodiment. The fluid manifold components 2180 can include components of both a fuel system and an auxiliary fluid system in another embodiment. In one compact arrangement the third member 2176C is configured to enable the fluid manifold components 2180 to be recessed into the upright frame 2160. A recessed configuration can allow the fluid manifold components 2180 be at least partially inward of a plane of the lateral sides of the elongate members 2172.

One approach to recessing the components 2180 is to form the third member 2176C with a bight along the direction from the forward to rearward. The bight can be seen in a top view of the third member 2176C. The bight has a first portion that extends away from the lateral side of the upright frame 2160 toward a transverse center of the fluid system 2116, a second portion that extends along the forward-to-rearward direction, and a third portion that extends from the second portion toward the lateral side of the upright frame 2160. The first portion and the third portion are coupled with the forward and rearward elongate members 2172 respectively. The extent of the first and third portions controls the depth of recessing of the second portion of the third member 2176C. The recessing can be at least 25% of the dimension of the fluid manifold components 2180 as measured in the transverse direction. The recessing can be at least 50% of the dimension of the fluid manifold components 2180 as measured in the transverse direction. The recessing can be at least 100% or more of the dimension of the fluid manifold components 2180 as measured in the transverse direction. The fluid manifold components 2180 can be nested into the area at least partially surrounded by the bight of the third member 2176C. The nesting of the fluid manifold components 2180 provides some protection for these components and also reduces the width of the system 2116 overall. Reduced width can contributed to weight reduction and to aerodynamic drag contribution by the system 2166 to the vehicle 2100.

In the illustrated embodiment, the lateral members 2176A, 2176B, and 2176C are all mounted to outside surfaces of the elongate members 2172. In other embodiment, the lateral members 2176A, 2176B, and 2176C can be coupled with inside surfaces of the elongate members 2172, e.g., the side facing the space surrounded by the frame assembly 2140.

FIG. 5 shows that in one embodiment, of the first and second upright frames 2160, 2164 each have a fuel pressure vessel support 2190 and an auxiliary fluid pressure vessel support 2194. The fuel pressure vessel support 2190 is configured to receive and retain an end portion 2304 (See FIG. 8) of the fuel pressure vessel 2118. For example, in one embodiment a mounting block assembly is provided in which a first block portion is configured to support a boss 2308 of the end portion 2304 from beneath. The first block can have a semi-cylindrical surface upon which a lower portion of the boss 2308 rests in a free state. The block assembly can have a second block that is placed over the boss 2308 to cover the boss. For example, the second block can have a semi-cylindrical surface that can be disposed over a top surface of the boss 2308. The first and second blocks of the block assembly can form a cylindrical surface that surrounds the boss 2308. The first block can be secured to the first lateral members 2176A. The second block can be secured to the second lateral member 2176B directly above the first lateral member 2176A to which the first block is secured. The block assembly enables the lateral members 2176A, 2176B to indirectly support the boss 2308 and thereby the fuel pressure vessel 2118.

In one embodiment, a block assembly is used to support the end portion 2304 and a block assembly is used to support the end portion 2306, which is an end portion of the fuel pressure vessel 2118 opposite the end portion 2304. The end portion 2304 will usually be supported in the fluid system 2116 adjacent to the location of the access panels 2132A, 2132B of the cowling 2112. This allows a user to access fill and bleed ports 2316, 2320 of the fuel pressure vessel 2118 as needed. The ports 2316, 2320 can be directly accessed or can be in fluid communication with a fluid line that is remote from the ports 2316, 2320. This would permit the pressure vessel 2118 to be mounted in the opposite orientation such that the ports 2316, 2320 are not close to or accessible through the panel 2132A, 2132B.

The auxiliary fluid vessel 2120 can be supported in the same manner as the fuel pressure vessel 2118, for example, by a block assembly configured to form a cylindrical surface that surrounds a boss or other end portion of the vessel 2120. The block assembly can be mounted on the same or a similar structure to the members 2176A, 2176B. As discussed below, in certain embodiments to improve the integration of the auxiliary fluid vessel 2120 in the confined space of the cowling 2112 the vessel 2120 can be mounted in a different manner than the fuel pressure vessels 2120.

The fluid vessels 2118, 2120 preferably are mounted to the frame assembly 2140 in a compact array. The fluid system 2116 can have a plurality of fuel pressure vessel supports 2190 on each of the first upright frame 2160 and the second upright frame 2164 to support a plurality of fuel pressure vessels in a compact array. FIG. 6 shows that the compact array can include a vertically oriented array. The vertically oriented array can include providing a plurality of, e.g., four, fuel vessels 2120 aligned in a vertical plane. In one instance the central longitudinal axes of the pressure vessels 2120 can be disposed on a common vertical plane. In some embodiments, the central longitudinal axes of the pressure vessels 2120 can be disposed on a common horizontal plane. In some embodiments, the central longitudinal axes of the pressure vessels 2120 can be disposed on a common plane that is not vertical or horizontal but generally along a surface of the vehicle that is angled to one or both of these planes. A line connecting the central longitudinal axes of the pressure vessels 2120 can be arcuate, e.g., following a contour of a tailgate or other curved surface of a vehicle. In such embodiments, a central longitudinal axis of the fluid vessels 2118 may be spaced away from a line connecting the central longitudinal axes of two adjacent fuel vessels 2120.

FIG. 6 shows that in one embodiment a fuel pressure vessel 2118 at a first, e.g., a lowest, elevation 2196A can be disposed immediately below a second fuel pressure vessel 2118 at a second elevation 2196B. A compact arrangement of the fluid vessels 2118, 2120 can be provided by mounting the auxiliary fluid vessel 2120 at a third elevation 2196C that is above the first elevation 2196A and that is below the second elevation 2196B. In addition, the fluid vessel 2120 can be arranged away from the plane of the central axes of the fluid pressure vessels 2118 at the first and second elevations. For example, the central longitudinal axis of the auxiliary fluid vessel 2120 can be located away from, e.g., forward of, the central longitudinal axes of one or both of the fluid pressure vessels 2118 at the first and second elevations. The central longitudinal axis of the auxiliary fluid vessel 2120 can be located rearward of the central longitudinal axes of one or both of the fluid pressure vessels 2118 at the first and second elevations.

In one embodiment the auxiliary fluid vessel 2120 can be nested in with two fluid pressure vessels 2118. Nest means, broadly, that the auxiliary fluid vessel 2120 is received in a space between the two fuel pressure vessels 2118. For example, FIG. 6 shows that an area can be bounded by outer surfaces of two fuel pressure vessels 2118 and a forward portion of the frame assembly 2140. The auxiliary fluid vessel 2120 can be positioned in this area. The area so bounded can be further bounded by the forward-most portion of the two fuel pressure vessels 2118. In one embodiment, a vertical line intersecting an outer periphery of a first fuel pressure vessels 2118 at the first elevation 2196A and also intersecting an outer circumference of a second fuel pressure vessels 2118 at the second elevation 2196B also intersects the auxiliary fluid vessel 2120. The central longitudinal axis of the auxiliary fluid vessel 2120 can be located at this line. The central longitudinal axis of the auxiliary fluid vessel 2120 can be located between this line and a vertical plane intersecting the central longitudinal axis of the fuel pressure vessels 2118 at the first elevation 2196A and the fuel pressure vessels 2118 at the second elevation 2196B. These arrangements allow the cowling 2112 to extend nearly tangentially to the outer periphery of the fuel pressure vessels 2118 while at the same time enclosing the auxiliary fluid vessel 2120. These arrangements allow the auxiliary fluid vessel 2120 be positioned in a fuel system without significant enlargement or modification of the cowling 2112.

FIG. 6 shows that further fluid vessels can be provided in certain embodiments. A third fuel pressure vessel 2118 can be disposed at a fourth elevation above the second fuel pressure vessel 2118. A fourth pressure vessel 2118 can be disposed at a fifth elevation above the third fuel pressure vessel 2118. One or a plurality of additional fluid vessels 2120A can be provided in spaces similar to those discussed above. By providing a number of additional fluid vessels 2120A, the volume of fluid available for an auxiliary fluid system can be increased. By providing additional fluid vessels 2120A, the size of individual vessels 2120, 2120A can be reduced while still meeting the volume demands of a system.

The illustrated embodiments provide that both the first frame 2160 and the second frame 2164 support the fuel pressure vessel 2188 at fuel pressure vessel supports 2190. In another embodiment, at least one of the first frame 2160 and second frame 2164 has a fuel pressure vessel support 2190 and an auxiliary fluid pressure vessel support 2194. In another embodiment, only one of the first frame 2160 and the second frame 2164 has a fuel pressure vessel support 2190 and an auxiliary fluid pressure vessel support 2194. Other variations are possible. The auxiliary fluid pressure vessel support 2194 is spaced apart from the fuel pressure vessel support, as discussed further below.

The frame assembly 2140 can be strengthened by providing a number of braces, e.g., transverse braces 184 and/or disposed between the first and second upright frames 2160, 2164.

FIGS. 5 and 6 show further details of how the fuel pressure vessel 2118 and the auxiliary pressure vessel 2120 are integrated in the space defined by the frame assembly 2140. FIG. 6 shows that a front-to-back profile 2202 can be provided that yields a compact arrangement suitable for a behind the cab configuration. This arrangement provides a compact horizontal arrangement. In some applications a compact vertical arrangement is preferred. A compact vertical arrangement is preferable for roof-mounted systems.

Figure 7:
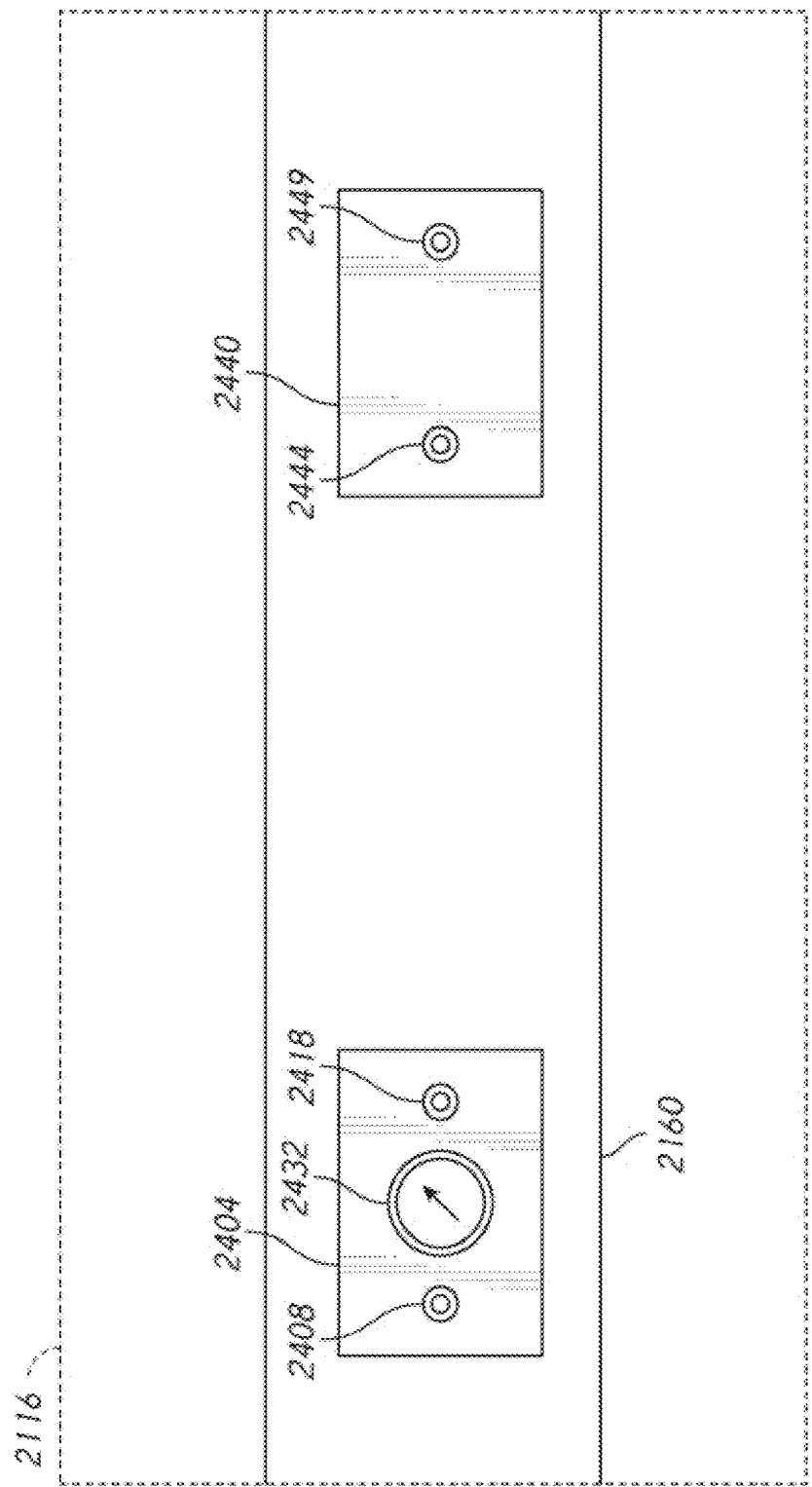
FIG. 7 shows a portion of a manifold that can be coupled with one or more pressure vessels of the fluid storage system of FIG. 3.
Figure 8:
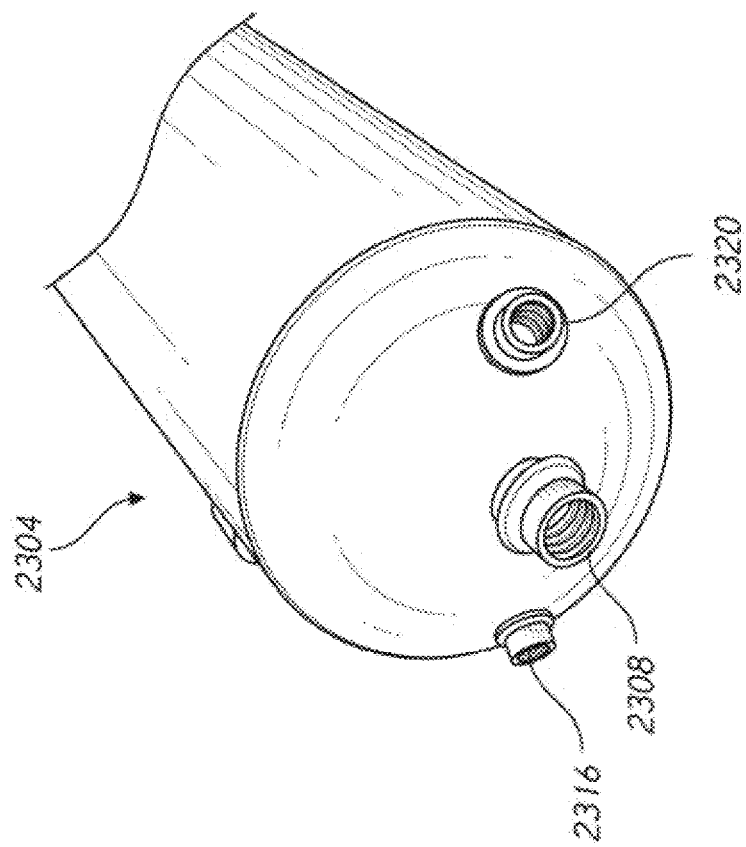
FIG. 8 is a perspective view of end portions of two tanks, illustrating ports of pressure vessels of the fluid storage system of FIG. 3.
Figure 8:
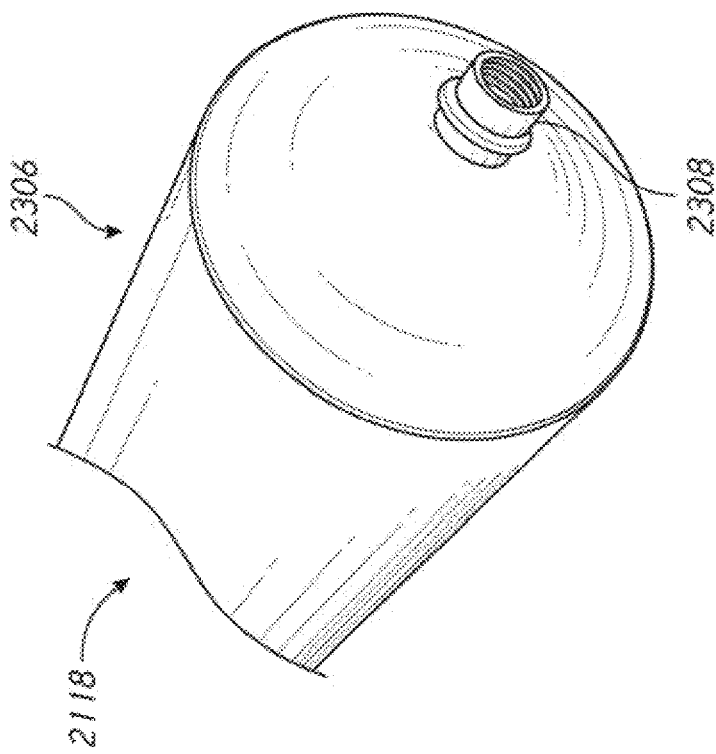

FIGS. 4 and 7 illustrate further aspects of a fluid system 2400 that can be at least partially integrated into the space surrounded by the frame assembly 2140 and/or the cowling 2112. In one embodiment, a forward portion of the fluid system 2116 includes an access panel 2404 for coupling the auxiliary fluid vessel 2120 with other components of the fluid system 2400. The panel 2404 can be formed at or through one of the transverse members 2160. The panel 2404 can include one or more connection ports to couple the vessel or vessels 2120 with other components of the fluid system 2400. The panel 2404 can include a first port 2408 coupled to a fluid line 2412 that extends between a foot valve 2416 and the vessel or vessels 2120. When the foot valve 2416 is depressed the pressure in the fluid line 2412 is communicated to brake lines coupled with brake chambers 2419. The pressure can be communicated to some or all of the wheels of the vehicle 2100. The panel 2404 can include a second port 2418 that can be coupled with a fluid line 2420 that extends from a compressor 2424 to the vessel or vessels 2120.

FIG. 7 also shows that a secondary panel 2440 can be provided with a first port 2444 and a second port 2448. The first port 2444 can be coupled with a valve or switch for powering a second fluid system, such as an air horn (not shown). The second port 2448 can be coupled with a source of fluid, such as air to supply a line coupled with the first port 2444. The second port 2448 can be coupled with an air compressor, for example. The first and second panels 2404, 2440 can be independently coupled with one, two or more than two independent fluid vessels 2120 through manifolds. In other embodiments, a common manifold can be provided that channels the flow of fluid to and from the vessels 2120.

Composite Interwoven Gas Containment Assemblies

Figure 9:
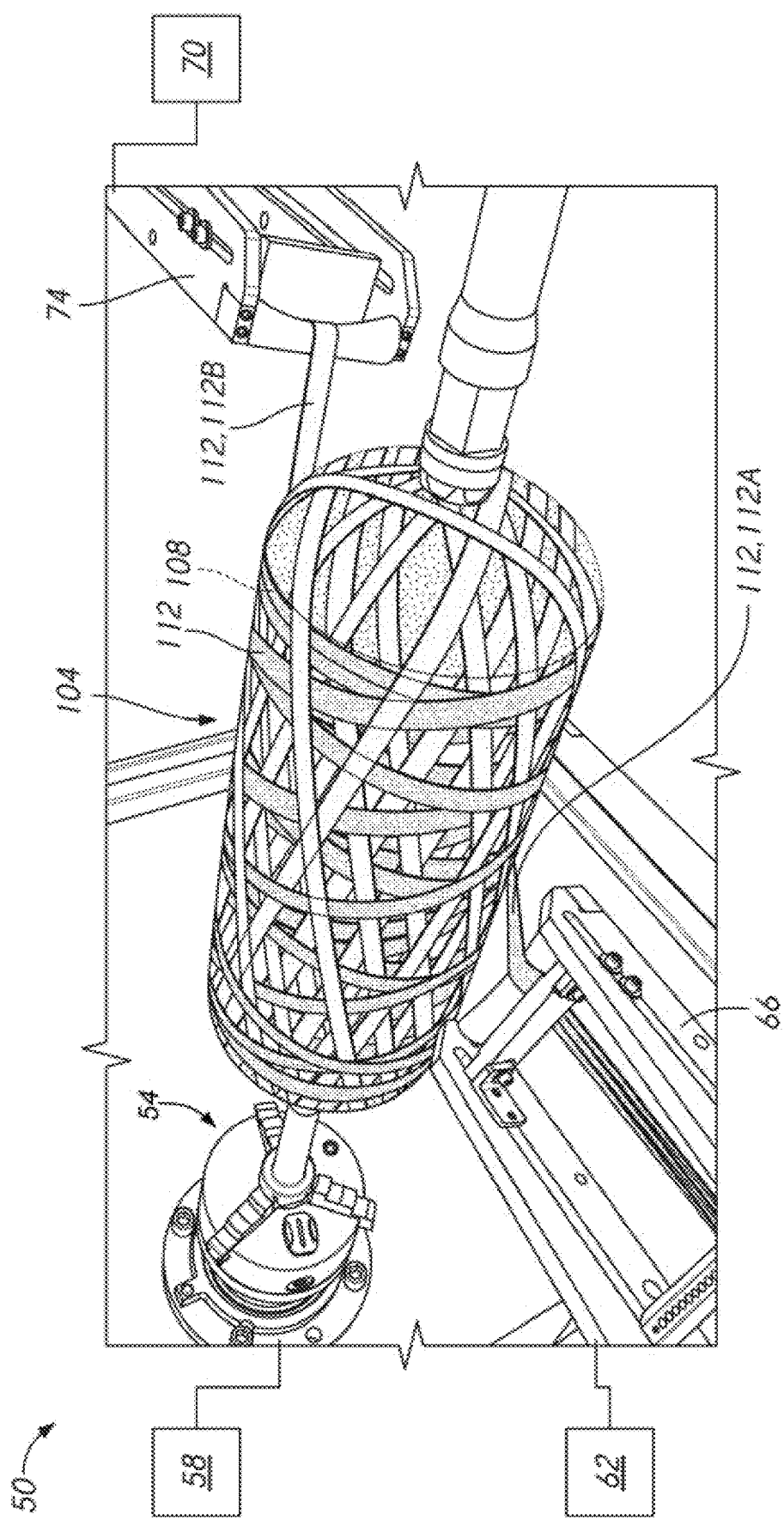
FIG. 9 shows a portion of a process of forming an improved gas cylinder, e.g., pressure vessel or fuel tank, using multiple winding eyes in a dual carriage winding apparatus.

FIG. 9 shows a winding apparatus 50 and a pressure vessel 100 being produced thereby. The winding apparatus 50 is a dual carriage apparatus. This disclosure is not limited to dual carriage and can extend to more than to two carriages in other examples of multiple carriage implementations. The winding apparatus 50 is configured to produce the pressure vessel 100 with interwoven filaments. The interwoven filaments are formed by simultaneous winding filaments using multiple carriages that can be independently controlled. The winding apparatus 50 includes a spindle 54 upon which a structural shell 104 can be produced. The structural shell 104 can include a substantially cylindrical form or liner 108. The liner 108 can be formed of polymer with a lightweight structure and is sometimes referred to herein as a lightweight liner. Other cylindrical forms could be used on the winding apparatus 50 for other applications. The spindle 54 includes a rotating chuck or similar apparatus that can support the liner 108 as it rotates about a longitudinal axis thereof. The rotation of the spindle 54 can be provided by a motor 58 mechanically coupled therewith.

The winding of filaments about the liner 108 can be performed by carriages of the winding apparatus 50. The winding apparatus 50 can include a first carriage 62 having a first eye 66 and a second carriage 70 having a second eye 74. The first carriage 62 can be disposed on one side of the spindle 54. The first carriage 62 can be moved along the side of the space in which the spindle 54 supports the liner 108. The movement of the first carriage 62 allows the filament to be applied to the liner 108 in a first pattern. For example, the first carriage 62 can be configured to spool out through the first eye 66 a filament 112 well suited to provide primarily radial support to the liner 104. The first eye 66 can spool out a first filament 112A comprising a first material composition or first configuration. The first filament 112A can be a hoop filament. In other embodiments, the first eye 66 can spool out the first filament 112A as a helical filament described in more detail below. Accordingly, the first filament 112A can incorporate the features described herein with respect to the second filament 112B.

The second carriage 70 can be spaced apart from the first carriage 62 and configured to move along the space where the liner 108 can be supported. The second carriage 70 can be disposed on an opposite side of the liner 108 from the first carriage 62 when the liner 108 is mounted to the spindle 54. The second carriage 70 can be configured to move independently of the first carriage 62. The second carriage 70 can orient the second eye 74 to spool out a second filament 112B. The second filament 112B can comprise a second material composition that is different from the first material composition in some applications. The second filament 112B can have a configuration that makes it well suited to be used as a helical filament. In other embodiments, the second eye 74 can spool out the second filament 112B as a hoop filament described in more detail below. Accordingly, the second filament 112B can incorporate the features described herein with respect to the first filament 112A. In some applications the second filament 112B comprises the same material as the first filament 112A. In some applications the second filament 112B includes the same material or materials as the first filament 112A. When formed of the same material or materials as the first filament 112A, the second filament 112B can be of the same or a different configuration (e.g., strength configuration, width, thickness). For example, the first filament 112A could have a high strength configuration (e.g., high strength carbon fiber material configuration with a strength at or over about 700 ksi, about 800 ksi, about 900 ksi, about 1000 ksi, about 1100 ksi, about 1200 ksi, about 1300 ksi, or strength in any range defined by any combination of the foregoing numbers as end points) and the second filament 112B could be of a lower or low strength configuration (e.g., a low or lower strength carbon fiber material configuration with a strength at or over about 300 ksi, about 400 ksi, about 500 about ksi, about 600 ksi or about 650 ksi or strength in any range defined by any combination of the foregoing numbers as end points or a glass fiber material with a strength of about 300 ksi). More generally, other materials than carbon fiber suitable for fiber wrapping as described herein with strength properties within the foregoing ranges for high strength configuration other than carbon fiber also can be used for the first filament 112A. Materials other than carbon and glass fiber suitable for fiber wrapping as described herein with strength properties within the foregoing ranges for lower or low strength configuration also can be used for the first filament 112A.

Figure 10A:
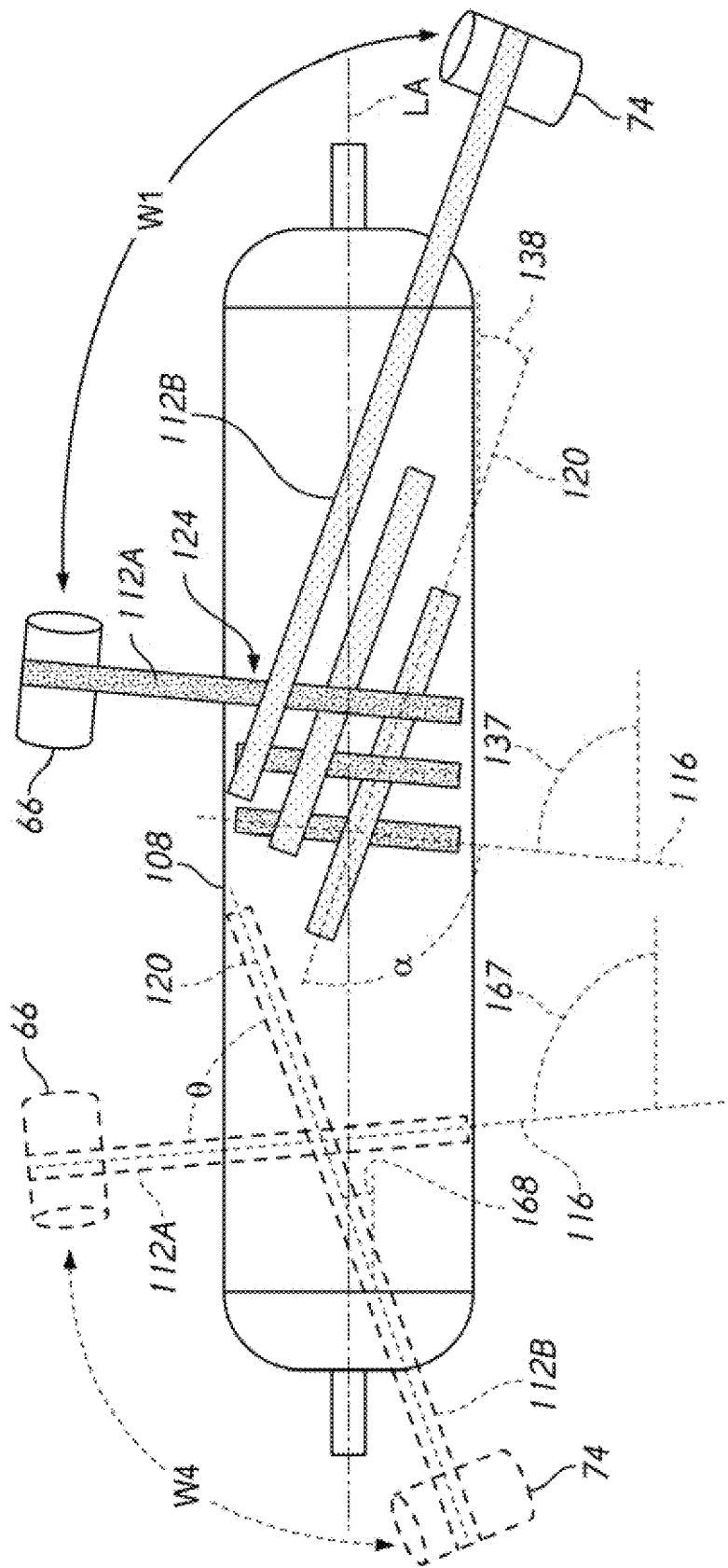
FIG. 10A is a schematic diagram further illustrating the winding apparatus of FIG. 9 and a first example method of winding filaments therewith.

FIGS. 10A-10D illustrate the winding apparatus 50 and example methods of winding filaments. For example, FIG. 10A shows further details of the winding apparatus 50 and the process of manufacturing the structural shell 104. The liner 108 is shown in a side view. As discussed above, the liner 108 is supported by the spindle 54 for rotation about a longitudinal axis LA thereof. The winding apparatus 50 is controlled to move the first eye 66 and the second eye 74 to various positions along the liner 108. Two such positions are seen in FIG. 10A. In particular, a winding position W1 is seen in solid lines in which the first eye 66 is controlled to spool out the first filament 112A in a primarily hoop direction 116. The primarily hoop direction 116 is a direction in which the longitudinal axis of the first filament 112A is oriented in a direction close to perpendicular to a meridian of the liner 108. The primarily hoop direction 116 in the winding position W1 can correspond to a hoop angle 137 between 60 and 90 degrees from a meridian (e.g., a line parallel to the longitudinal axis LA) of the liner 108. In some cases, the primarily hoop direction 116 corresponds to a hoop angle 137 between 70 and 90 from a meridian of the liner 108. In some cases, the primarily hoop direction 116 corresponds to a hoop angle 137 between 80 and 90 from a meridian of the liner 108.

In some cases, the primarily helical direction 120 corresponds to a helical angle 138 between about −20 degrees and about 0 degrees of a meridian of the liner 108 where negative degrees are measured as an angle between a first line extending from an origin at the left of the longitudinal axis and extending toward the right and a second line, such as the primarily helical direction 120, in the clockwise direction. The primarily helical direction 120 can correspond to a helical angle 138 between about −10 degrees and about 0 degrees of a meridian of the liner 108. The primarily helical direction 120 can correspond to a helical angle 138 between about −5 degrees and about 0 degrees of a meridian of the liner 108.

FIG. 10A shows three strands of the first filament 112A oriented toward the right at hoop angle 137. These three strands appear to be separate strands, but would normally be segments of a continuous first filament 112A that would extend around the liner 108, each segment separated from an adjacent segment by a small distance as shown. The distance between adjacent segments of the first filament 112A depends on several factors, including the rotational speed of the spindle 54 (and therefor the liner 108), the speed of movement of the first carriage 62, and the thickness of the first filament 112A. Similarly, the second filament 112B appears to be three separate strands oriented with right side ends angled downward relative to left side ends and being below the position of the longitudinal axis LA. These strands would normally be adjacent segments of a continuous second filament 112B wrapped around the liner 108. The spacing between adjacent segments of the second filament 112B would be a function of the rotational speed of the liner 108, the speed of movement of the second carriage 70, the orientation of the second eye 74, and the thickness of the second filament 112B.

The second filament 112B is wound about the liner 108 at the same time as the first filament 112A forming the interwoven structure discussed herein. The first carriage 62 and the first eye 66 would have a pre-defined orientation to the liner 108 in the winding position W1. The second carriage 70 and the second eye 74 also have a pre-defined orientation to the liner 108 in the position W1. In other words, the winding position W1 defines to orientation of both of the first eye 66 and the second eye 74 at the particular moment of winding seen in FIG. 2. The winding position W1 can define an orientation of the first eye 66 producing a primarily hoop direction 116 and an orientation of the second eye 74 producing a primarily helical direction 120. In some cases, other winding positions can be provided along a central length of the liner 108 that provide negative helical angles 138 and hoop angles 137 less than ninety degrees. These angles can vary randomly within each pass. These angles can vary in a predefined manner within each pass. These angles can vary in a predefined manner from a first pass to subsequent passes.

FIG. 10A shows a winding position W4, which corresponds to another winding condition or configuration of the winding apparatus 50. In the winding position W4 the first carriage 62 and the second carriage 70 are moved such that the first filament 112A and the second filament 112B are spooled out at different angles from those of the winding position W1. The first carriage 62 is moved along the longitudinal axis of the liner 108 to a position spaced apart from the position of the first carriage 62 in the winding position W1. The first eye 66 is oriented to a hoop angle 167. The hoop angle 167 can be between about 90 and about 120 degrees from a meridian of the liner 108. In some cases, the primarily hoop direction 116 corresponds to a hoop angle 167 between about 110 and about 90 from a meridian of the liner 108. In some cases, the primarily hoop direction 116 corresponds to a hoop angle 167 between about 100 and about 90 from a meridian of the liner 108.

The winding position W4 provides in some cases that the primarily helical direction 120 corresponds to a helical angle 168 between about 0 and about 20 degrees from a meridian of the liner 108. The primarily helical direction 120 can correspond to a helical angle 168 between about 0 and about 10 degrees of a meridian of the liner 108. The primarily helical direction 120 can correspond to a position between about 0 and about 5 degrees of a meridian of the liner 108. The winding position W4 can vary in the operation of the winding apparatus 50. For example, a portion of the winding of the liner 108 can have a first combination of hoop angle 167 larger than 90 degrees and a helical angle 168 larger than 0 degrees and a second portion of the winding of the liner 108 can have another combination of hoop angle 167 larger than 90 degrees and a helical angle 168 larger than 0 degrees.

Other winding positions are possible between the winding position W1 and the winding position W4 as discussed further below. In some cases, the first carriage 62 and the second carriage 70 move along the length of the liner 108 several times to provide for complete coverage of the liner 108 as discussed further below. As the first carriage 62 and second carriage 70 move the winding position W1 and the winding position W4 can vary such that the angles of the first filament 112A and the second filament 112B to the meridian or to each other vary over the length of the structural shell 104.

FIG. 10A shows that the winding process results in a woven or interwoven structure of the first filament 112A and the second filament 112B. The process enables continuous strands of the filament 112 and the second filament 112B to achieve complete coverage of the liner 108 without requiring cutting of the first filament 112A to allow the filament 112 to be reoriented to a primarily helical direction. The location of the first filament 112A can be limited to the portion of the liner 108 requiring more radial reinforcement. Also, the second filament 112B can be configured for the purpose of supporting the liner 108 against axial loads. The second filament 112B need not be reoriented to a primarily hoop direction, which would require inefficient use of material and also would constrain the possible movements of the second carriage 70 and the second eye 74.

FIG. 10A shows that as the first carriage 62 and the second carriage 70 progress in the winding position W1, a single turn of the second filament 112B will pass over and under adjacent strands of the first filament 112A. In particular, the middle segment of the second filament 112B is seen to pass over the left two segments of the first filament 112A and to pass under the right-most segment of the first filament 112A depicted. This provides an interwoven or woven configuration of the second filament 112B and the first filament 112A. The same can be said for the first filament 112A. The middle segment of the first filament 112A can be seen to pass under the upper two segments of the second filament 112B while passing over the lower-most segment of the second filament 112B. This provides an interwoven or woven configuration of the first filament 112A and the second filament 112B. These over-under arrangements of the first filament 112A and the second filament 112B provide uniformity in material properties, in particular of stiffness, across the expanse of a layer 128 in the radial direction as a three dimensional interwoven construct is formed, as discussed further below.

The winding position W1 produces a first braid angle $\alpha$. The first braid angle $\alpha$ can be about 90 degrees, about 95 degrees, about 100 degrees, about 105 degrees, about 110 degrees, or within a range defined by any two of the foregoing end points, between first filament 112A in a primarily hoop direction 116 and an adjacent woven second filament 112B in a primarily helical direction 120. The winding position W4 produces a fourth braid angle $\theta$ between the primarily helical direction 120 and the primarily hoop direction 116. The fourth braid angle $\theta$ can be about 90 degrees, about 95 degrees, about 100 degrees, about 105 degrees, about 110 degrees, or within a range defined by any two of the foregoing end points, between a first filament 112A in a primarily hoop direction 116 and an adjacent woven second filament 112B in a primarily helical direction 120. In one embodiment, the fourth braid angle $\theta$ in the winding position W4 is the same as the first braid angle $\alpha$ in the winding position W1.

In some embodiments, filament winding may be categorized into three types: hoop winding corresponding to a winding angle between about 88 and 90 degrees from a meridian of the liner 108, a high-angle helical winding corresponding to a helical angle between about 60 to 88 degrees from a meridian of the liner 108, and a low-angle helical winding corresponding to a helical angle within about 60 degrees from the meridian of the liner 108. While the filament spooling angles may be described herein as being in the primarily hoop direction or the primarily helical direction, in some embodiments, the primarily hoop direction may refer to hoop winding having a winding angle between about 88 and 90 degrees from a meridian of the liner 108 or a high-angle helical winding corresponding to a helical angle between about 60 to 88 degrees from a meridian of the liner 108, and the primarily helical direction may refer to a low-angle helical winding corresponding to a helical angle within about 60 degrees from the meridian of the liner 108.

In embodiments that include spooling out filament in both the primarily hoop direction and the primarily helical direction, such as the embodiment of FIG. 10A, where the first eye 66 spools out filament in the primarily hoop direction 116 and the second eye 74 spools out filament in the primarily helical direction 120, the first eye 66 may spool filament at a different rate than the second eye 74 due to the different amount of filament used with each rotation of the liner on the winder, causing an excess of filament with respect to the eye that is spooling out filament in the primarily hoop direction (e.g., the first eye 66 of FIG. 10A) that must be used to achieve the desired thickness of filament on the liner. For example, more filament is used by the second eye 74 than by the first eye 66 with every rotation of liner 108 about the longitudinal axis LA, due to the first eye 66 being positioned at a higher angle (e.g., angle 137) than the second eye 74 (e.g., angle 138), causing an excess of filament for the first eye 66 to deposit.

This excess filament with respect to the first eye 66 can be addressed in various ways. For example, the first eye 66 may be used to spool out the first filament 112A prior to spooling out the second filament 112B with the second eye 74 and/or prior to simultaneously spooling the first filament 112A and the second filament 112B in interwoven layers to achieve the desired thickness of filament. In other words, filament may be wrapped in only the primarily hoop direction or a high-angle helical direction (e.g., a relatively high angle with respect to the longitudinal axis) before beginning wrapping of interwoven layers. As another example, the first eye 66 may be used to spool out the first filament 112A after spooling out the second filament 112B with the second eye 74 and/or after simultaneously spooling the first filament 112A and the second filament 112B in interwoven layers to achieve the desired thickness of filament. In other words, filament may be wrapped in only the primarily hoop direction or a high-angle helical direction (e.g., a relatively high angle with respect to the longitudinal axis) after completion of wrapping of interwoven layers. As another example, the first eye 66 may be used to spool out the first filament 112A prior to and after spooling out the second filament 112B with the second eye 74 and/or prior to and after simultaneously spooling the first filament 112A and the second filament 112B in interwoven layers to achieve the desired thickness of filament. In other words, filament may be wrapped in only the primarily hoop direction or a high-angle helical direction (e.g., a relatively high angle with respect to the longitudinal axis) both before beginning wrapping of interwoven layers and after completion of wrapping of interwoven layers. As another example, during the winding process, both the first eye 66 and the second eye 74 can be transitioned to an orientation such that both eyes spool out filament in the primarily hoop direction or a high-angle helical direction to achieve the desired thickness of filament. The second eye 74 can later to return to an orientation that allows for spooling out the second filament 112B in the primarily helical direction 120. In other words, in the middle of (e.g., during) wrapping filament in interwoven layers (e.g., with one high angle or primarily hoop direction eye and one low angle or primarily helical direction eye), the system may transition to simultaneously wrapping in the primarily hoop direction or high-angle helical direction (e.g., a relatively high angle with respect to the longitudinal axis) with both eyes, and then transition back to the interwoven wrapping, with one high-angle helical or primarily hoop direction eye and one low-angle helical or primarily helical direction eye. Embodiments where the first eye 66 and the second eye 74 spool out filament in the same direction will be described in further detail below.

In some embodiments, instead of one carriage winding in primarily the hoop direction and the other carriage winding in primarily the helical direction, the first carriage 62 and the second carriage 70 can be configured to spool out filament in the same direction (e.g., both in the primarily hoop direction or both in the primarily helical direction), as described in further detail below. The angles associated with the first carriage 62 and the second carriage 70 need not be the same to be considered as spooling out filament in the same direction (e.g., in the primarily hoop direction or in the primarily helical direction). For example, each of the following non-limiting examples of angular ranges for hoop angles 137 and 139 (see FIG. 10B and FIG. 10C) would be considered to both be in the primarily hoop direction (or hoop direction or high-angle helical direction), even if the angles are not equal to each other: hoop angles 137 and 139 both being within a range of 60-90, 70-90, or 80-90 degrees from the meridian of the liner 108; one of hoop angle 137 or 139 being within a range of 60-90 degrees, while the other of hoop angle 137 or 139 is within a range of 70-90 or 80-90 degrees from the meridian of the liner 108; and one of hoop angle 137 or 139 being within a range of 70-90 degrees, while the other of hoop angle 137 or 139 is within a range of 80-90 degrees from the meridian of the liner 108. As another example, each of the following non-limiting examples of angular ranges for helical angles 119 and 138 (see FIG. 10D and FIG. 10E) would be considered to both be in the primarily helical direction (or low-angle helical direction), even if the angles are not equal to each other: helical angles 119 and 138 both being with a range of 0-60, 0-50, 0-40, 0-30, 0-20, 0-10, or 0-5 degrees from the meridian of the liner 108; one of helical angle 119 or 138 being within a range of 0-60 or 0-50 degrees, while the other of helical angle 119 or 138 is within a range of 0-5 or 0-10 degrees from the meridian of the liner 108; and one of helical angle 119 or 138 being within a range of 0-10 degrees, while the other of helical angle 119 or 138 is within a range of 0-5 degrees from the meridian of the liner 108.

Figure 10B:
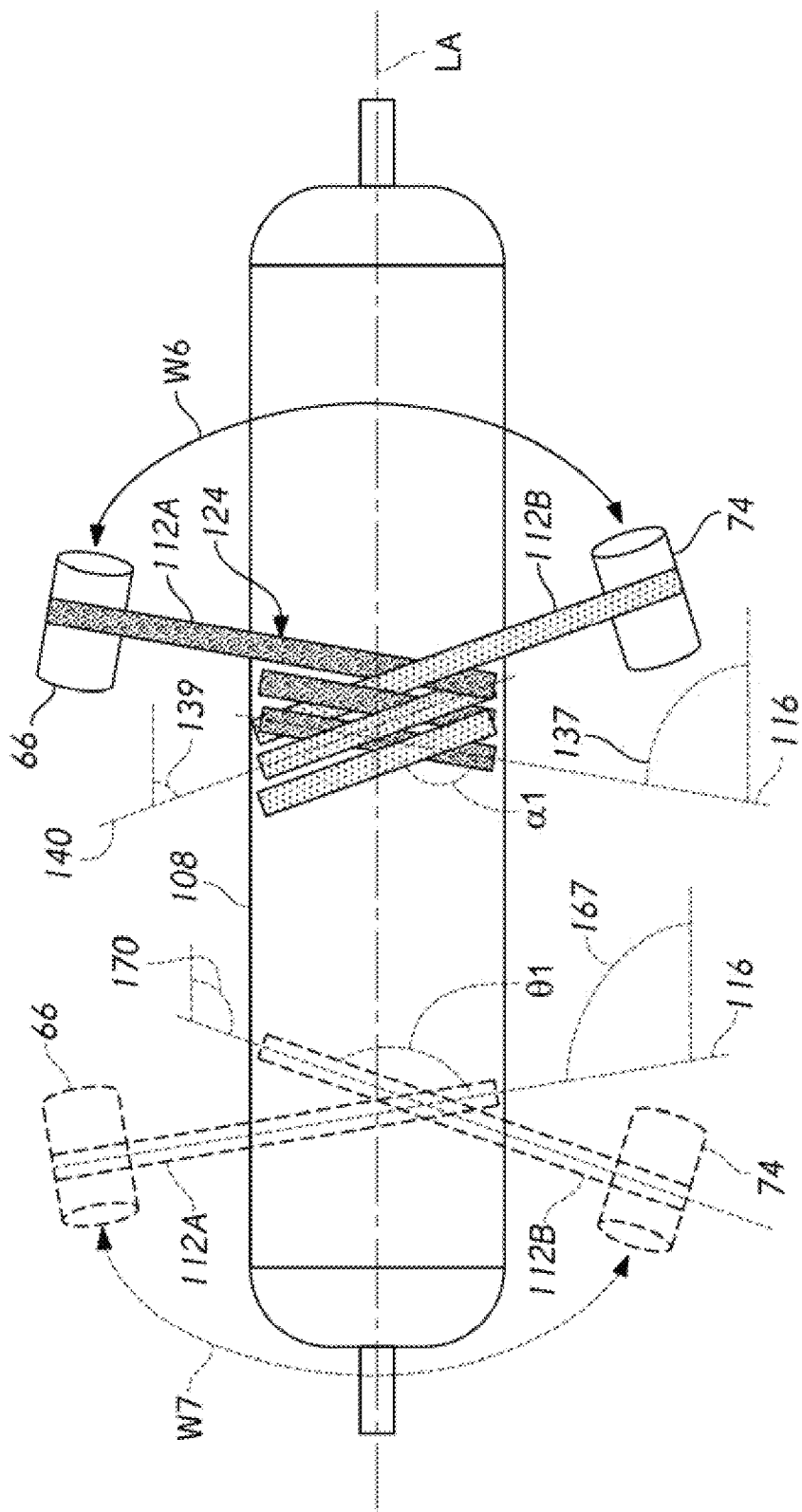
FIG. 10B is a schematic diagram further illustrating the winding apparatus of FIG. 9 and a second example method of winding filaments therewith.
Figure 10C:
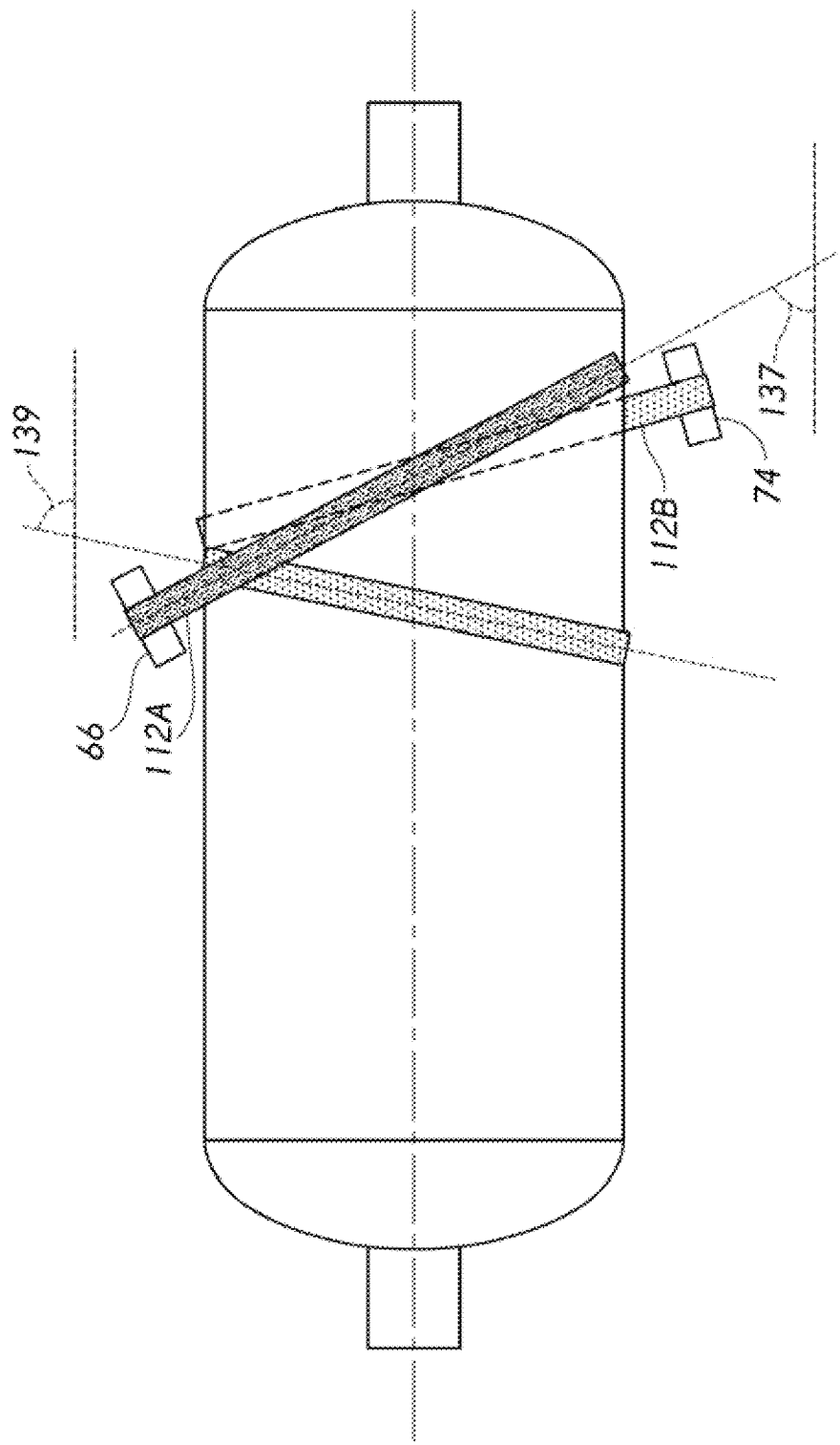
FIG. 10C is a schematic diagram further illustrating the winding apparatus of FIG. 9 and aspects of the second example method of winding filaments therewith.
Figure 10D:
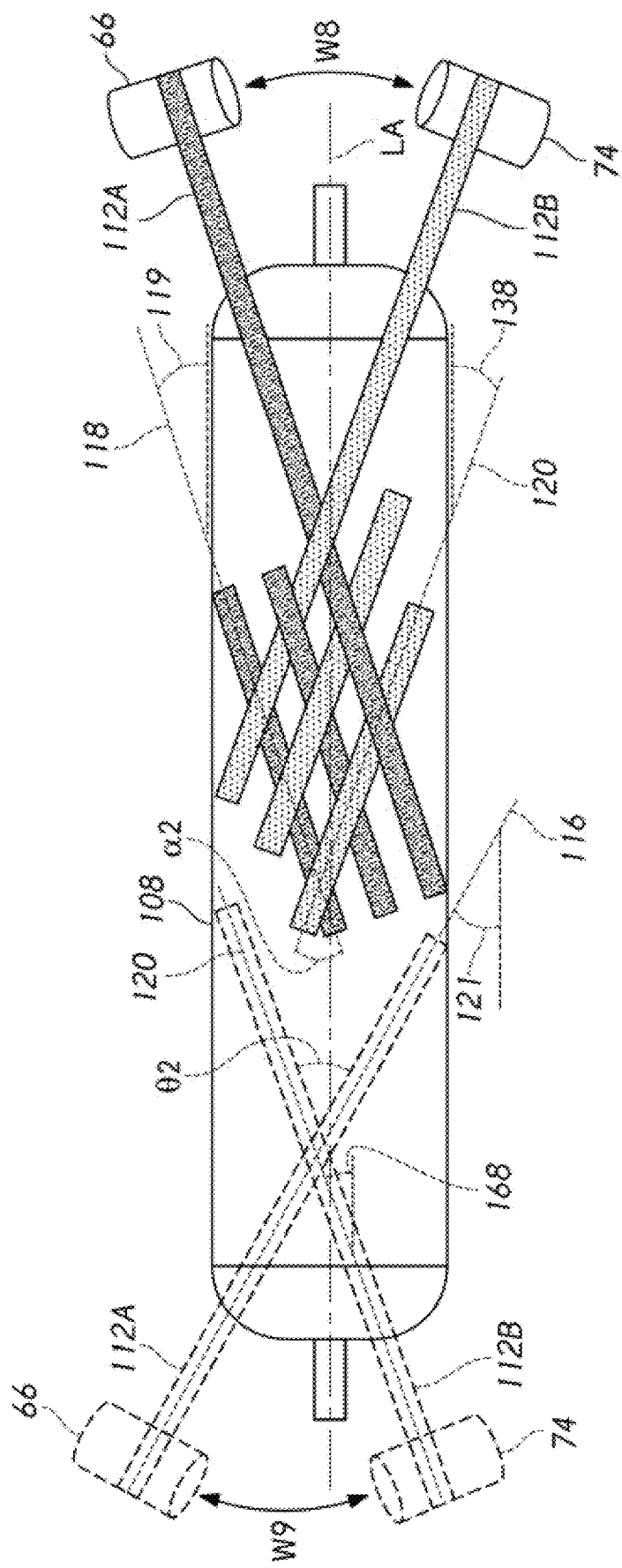
FIG. 10D is a schematic diagram further illustrating the winding apparatus of FIG. 9 and a third example method of winding filaments therewith.
Figure 10E:
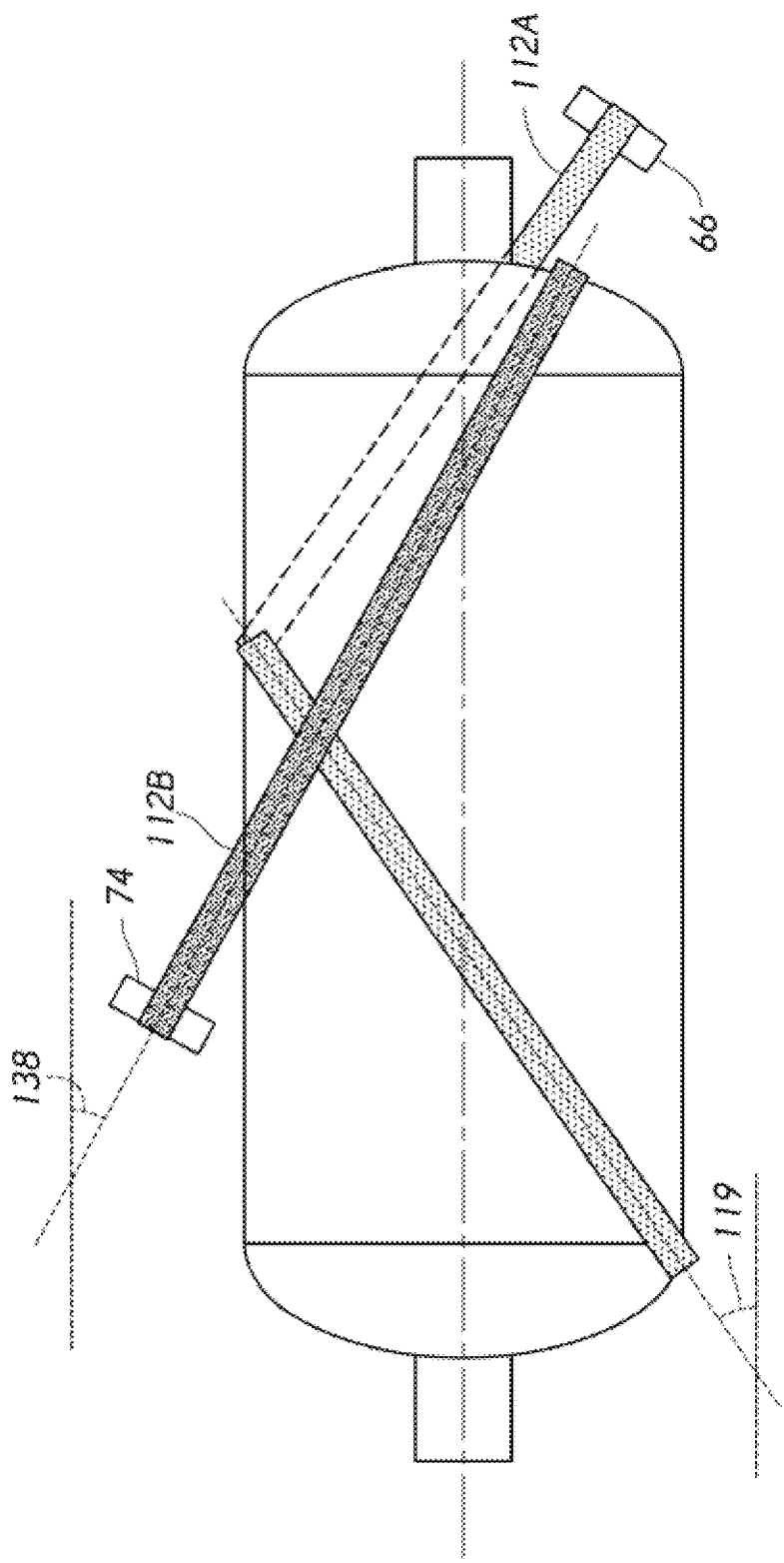
FIG. 10E is a schematic diagram further illustrating the winding apparatus of FIG. 9 and aspects of the third example method of winding filaments therewith.

In one embodiment, both the first carriage 62 and the second carriage 70 can spool out filament in the primarily hoop direction (or hoop direction or high-angle helical direction), as shown in FIG. 10B and FIG. 10C. In another embodiment, both the first carriage 62 and the second carriage 70 can spool out filament in the primarily helical direction (or low-angle helical direction), as shown in FIGS. 10D and 10E. In some embodiments, the first carriage 62 and the second carriage 70 can be configured to switch between spooling out filament both in the helical direction, to both in the hoop direction, and/or to one in the helical direction and one in the hoop direction. The carriages 62, 70 can be programmed to switch directions as needed. The ability for the carriages 62, 70 to switch directions can be advantageous as it can increase the speed of the process and lower manufacturing time.

In some embodiments, a single carriage can be used at a time. For example, carriage 62 can spool out filament while carriage 70 is not spooling out filament. Alternatively, carriage 70 can spool out filament while carriage 62 is not spooling out filament. For example, spooling out filament from one or both carriages 62, 70 in a primarily helical direction can be advantageous to apply the filament to the dome portions of the liner 108. Spooling out filament in the primarily hoop direction from both carriages 62, 70 along the cylindrical portion of the liner 108 can be advantageous in reducing manufacturing time.

FIG. 10B illustrates the winding apparatus 50 being controlled to move the first eye 66 and the second eye 74 to various positions along the liner 108 that correspond to both eyes being configured to spool out filament in a primarily hoop direction (or hoop direction or high-angle helical direction). In particular, a winding position W6 is seen in solid lines in which the first eye 66 is controlled to spool out the first filament 112A in a primarily hoop direction 116. The primarily hoop direction 116 in the winding position W6 can correspond to a hoop angle 137 between 60 and 90 degrees from a meridian (e.g., a line parallel to the longitudinal axis LA) of the liner 108. In some cases, the primarily hoop direction 116 corresponds to a hoop angle 137 between 70 and 90 degrees from a meridian of the liner 108. In some cases, the primarily hoop direction 116 corresponds to a hoop angle 137 between 80 and 90 from a meridian of the liner 108.

FIG. 10B shows three strands of the first filament 112A oriented toward the right at hoop angle 137. These three strands appear to be separate strands, but would normally be segments of a continuous first filament 112A that would extend around the liner 108, each segment separated from an adjacent segment by a small distance as shown. The distance between adjacent segments of the first filament 112A depends on several factors, including the rotational speed of the spindle 54 (and therefore the liner 108), the speed of movement of the first carriage 62, and the thickness of the first filament 112A. The second filament 112B appears to be three separate strands oriented to the left at hoop angle 139. The hoop angle 139 can correspond to an angle between 60 and 90 degrees from a meridian (e.g., a line parallel to the longitudinal axis LA) of the liner 108. In some cases, the hoop angle 139 can be between 70 and 90 degrees from a meridian of the liner 108. In some cases, the hoop angle 139 can be between 80 and 90 from a meridian of the liner 108. These strands would normally be adjacent segments of a continuous second filament 112B wrapped around the liner 108. The spacing between adjacent segments of the second filament 112B would be a function of the rotational speed of the liner 108, the speed of movement of the second carriage 70, the orientation of the second eye 74, and the thickness of the second filament 112B.

The second filament 112B is wound about the liner 108 at the same time as the first filament 112A forming the interwoven structure discussed herein. The first carriage 62 and the first eye 66 would have a pre-defined orientation to the liner 108 in the winding position W6. The second carriage 70 and the second eye 74 also have a pre-defined orientation to the liner 108 in the position W6. In other words, the winding position W6 defines the orientation of both of the first eye 66 and the second eye 74 at the particular moment of winding seen in FIG. 10B. The winding position W6 can define an orientation of the first eye 66 producing a first primarily hoop direction 116 and an orientation of the second eye 74 producing a second primarily hoop direction 140. In some cases, other winding positions can be provided along a central length of the liner 108 that provide hoop angles 137, 139 below the LA or above the LA, but in either case between 60 and 90 degrees of the LA. These angles can vary randomly within each pass. These angles can vary in a predefined manner within each pass. These angles can vary in a predefined manner from a first pass to subsequent passes.

The first eye 66 and the second eye 74 can be oriented such that the first eye 66 and the second eye 74 are at equal-and-opposite angles. For example, hoop angles 137, 139 can comprise the same numerical value but be on opposite sides of the plane from which the angle is measured. In some embodiments, the hoop angles 137, 139 can be different numerical values and be on opposite sides of the plane from which the angle is measured. In some embodiments, the hoop angles 137, 139 can be different numerical values and be on the same side of the plane from which the angle is measured. In instances where the numerical values of the hoop angles 137, 139 are different the angles can be within a predetermined number of degrees of each other (such as, for example, within 1, 5, or 10 degrees of each other). The values of the hoop angles 137, 139 can change during the winding process and may apply at any specific instances in time during the winding process.

The change of the values of the hoop angles 137, 139 during the winding process may be controlled. For example, the relationship between the hoop angles 137, 139 (e.g., whether hoop angles 137, 139 have the same or different numerical values and/or the difference in values) can be maintained or controlled during the winding process. In one non-limiting example, if the hoop angle 137 increases by 5, 10, or 15 degrees, hoop angle 139 may also increase by 5, 10, or 15 degrees, respectively. In another non-limiting example, if the hoop angle 137 increases by 5, 10, or 15 degrees, hoop angle 139 may decrease by 5, 10, or 15 degrees, respectively. In another non-limiting example, if the hoop angle 137 increases by a first amount, hoop angle 139 may increase by an amount that is within 1, 2, 5, or 10 degrees of the first amount. In another non-limiting example, if the hoop angle 137 increases by a first amount, hoop angle 139 may decrease by an amount that is within 1, 2, 5, or 10 degrees of the first amount. In another non-limiting example, the change in degrees of hoop angles 137, 139 may be unrelated to each other.

FIG. 10B shows a winding position W7, which corresponds to another winding condition or configuration of the winding apparatus 50. In the winding position W7 the first carriage 62 and the second carriage 70 are moved such that the first filament 112A and the second filament 112B are spooled out at different angles from those of the winding position W6, but both still preferably in the primarily hoop direction. The first carriage 62 is moved along the longitudinal axis of the liner 108 to a position spaced apart from the position of the first carriage 62 in the winding position W6. The first eye 66 is oriented to a hoop angle 167. The hoop angle 167 can be between about 90 and about 120 degrees from a meridian of the liner 108. In some cases, the primarily hoop direction 116 corresponds to a hoop angle 167 between about 110 and about 90 from a meridian of the liner 108. In some cases, the primarily hoop direction 116 corresponds to a hoop angle 167 between about 100 and about 90 from a meridian of the liner 108.

The winding position W7 can vary in the operation of the winding apparatus 50. For example, a portion of the winding of the liner 108 can have a first combination of a first hoop angle 167 larger than 90 degrees and a second hoop angle 170 larger than 90 degrees and a second portion of the winding of the liner 108 can have another combination of a first hoop angle 167 larger than 90 degrees and a second hoop angle 170 larger than 90 degrees. The hoop angles 167, 170 can have the same or different numerical values as those described above with reference to hoop angles 137, 139.

Other winding positions are possible between the winding position W6 and the winding position W7. In some cases, the first carriage 62 and the second carriage 70 move along the length of the liner 108 several times to provide for complete coverage of the liner 108 as discussed further below. As the first carriage 62 and second carriage 70 move the winding position W6 and the winding position W7 can vary such that the angles of the first filament 112A and the second filament 112B to the meridian or to each other vary over the length of the structural shell 104.

FIG. 10B shows that the winding process results in a woven or interwoven structure of the first filament 112A and the second filament 112B. The process enables continuous strands of the filament 112 and the second filament 112B to achieve complete coverage of the liner 108 without requiring cutting of the first filament 112A to allow the filament 112 to be reoriented from a first angle to a second angle, both oriented in the primarily hoop direction.

FIG. 10B shows that as the first carriage 62 and the second carriage 70 progress in the winding position W6, a single turn of the second filament 112B will pass over and under adjacent strands of the first filament 112A. In particular, the middle segment of the second filament 112B is seen to pass over the left two segments of the first filament 112A and to pass under the right-most segment of the first filament 112A depicted. This provides an interwoven or woven configuration of the second filament 112B and the first filament 112A. The same can be said for the first filament 112A. The middle segment of the first filament 112A can be seen to pass under the left most segments of the second filament 112B while passing over the right-most segment of the second filament 112B. This provides an interwoven or woven configuration of the first filament 112A and the second filament 112B. These over-under arrangements of the first filament 112A and the second filament 112B provide uniformity in material properties, in particular of stiffness, across the expanse of a layer 128 in the radial direction as a three dimensional interwoven construct is formed, as discussed further below.

The winding position W6 produces a first braid angle α1. The first braid angle α1 can be greater than or equal to about 90 degrees and less than or equal to about 180 degrees, or within a range defined by any two of the foregoing end points, between first filament 112A in a first primarily hoop direction 116 and an adjacent woven second filament 112B in a second primarily hoop direction 140. The winding position W7 produces a fourth braid angle θ1 between the primarily hoop direction 140 and the primarily hoop direction 116. The fourth braid angle θ1 can be greater than or equal to about 90 degrees and less than or equal to about 180 degrees, or within a range defined by any two of the foregoing end points, between a first filament 112A in a first primarily hoop direction 116 and an adjacent woven second filament 112B in a second primarily hoop direction 140. In one embodiment, the fourth braid angle θ1 in the winding position W7 is the same as the first braid angle α1 in the winding position W6. In another embodiment, the fourth braid angle θ1 in the winding position W7 is different than the first braid angle α1 in the winding position W6.

While FIG. 10B illustrates the first eye 66 and the second eye 74 at a similar longitudinal location relative to the length of the liner 108, when the first eye 66 and the second eye 74 move asynchronously relative to each other, the first eye 66 and the second eye 74 are often not at similar longitudinal locations and winding directions. As a result, while the filament may nonetheless be interweaved, it may not be interweaved in a tight lattice arrangement as depicted in FIG. 10B. FIG. 10C illustrates an arrangement where the first eye 66 and the second eye 74 are at different longitudinal locations along the length of the liner 108.

FIG. 10C illustrates the first eye 66 and the second eye 74 both winding in a hoop angle or high-angle helical orientation. FIG. 10C also illustrates the second eye 74 winding underneath or behind the liner 108 into the page. As shown in FIG. 10C, the first eye 66 and the second eye 74 may move independently and thus are at different longitudinal locations along the length of the liner 108. In addition, the wind angles 137, 139 may be different, resulting in further variations on locations of the first eye 66 and the second eye 74 along the length of the liner 108 as the filament is deposited onto the liner. Nonetheless, the first eye 66 and the second eye 74 still create interwoven strands of filament as they deposit filament onto the liner 108. As the first filament 112A and the second filament 112B are deposited, they create braid angles, as described herein. While FIG. 10C illustrates the first eye 66 moving right to left and the second eye 74 moving left to right, because of the asynchronous movement of the first eye 66 relative to the second eye 74, at some points during the winding, the first eye 66 and the second eye 74 may be moving in the same direction, or the first eye 66 and the second eye 74 may be moving in opposite directions.

FIG. 10D illustrates the winding apparatus 50 being controlled to move the first eye 66 and the second eye 74 to various positions along the liner 108 that correspond to both eyes being configured to spool out filament in a primarily helical (or a low-angle helical) direction. In particular, a winding position W8 is seen in solid lines in which the first eye 66 is controlled to spool out the first filament 112A in a primarily helical direction 118. The primarily helical direction 118 in the winding position W8 can correspond to a helical angle 119 less than about 60 degrees from a meridian (e.g., a line parallel to the longitudinal axis LA) of the liner 108. In some cases, the primarily helical direction corresponds to a helical angle 119 within a range of 0-5, 0-10, 0-20, 0-30, 0-40, 0-50, or 0-60 degrees from a meridian of the liner 108.

In some cases, a second primarily helical (or a low-angle helical) direction 120 corresponds to a helical angle 138 being within a range of 0-5, 0-10, 0-20, 0-30, 0-40, 0-50, or 0-60 degrees from a meridian of the liner 108.

FIG. 10D shows three strands of the first filament 112A with right side ends angled upward relative to left side ends and being above the position of the longitudinal axis LA. These three strands appear to be separate strands, but would normally be segments of a continuous first filament 112A that would extend around the liner 108, each segment separated from an adjacent segment by a small distance as shown. The distance between adjacent segments of the first filament 112A depends on several factors, including the rotational speed of the spindle 54 (and therefore the liner 108), the speed of movement of the first carriage 62, and the thickness of the first filament 112A. Similarly, the second filament 112B appears to be three separate strands oriented with right side ends angled downward relative to left side ends and being below the position of the longitudinal axis LA. These strands would normally be adjacent segments of a continuous second filament 112B wrapped around the liner 108. The spacing between adjacent segments of the second filament 112B would be a function of the rotational speed of the liner 108, the speed of movement of the second carriage 70, the orientation of the second eye 74, and the thickness of the second filament 112B.

The second filament 112B is wound about the liner 108 at the same time as the first filament 112A forming the interwoven structure discussed herein. The first carriage 62 and the first eye 66 would have a pre-defined orientation to the liner 108 in the winding position W8. The second carriage 70 and the second eye 74 also have a pre-defined orientation to the liner 108 in the position W8. In other words, the winding position W8 defines the orientation of both of the first eye 66 and the second eye 74 at the particular moment of winding seen in FIG. 10C. The winding position W8 can define an orientation of the first eye 66 producing a first primarily helical direction 118 and an orientation of the second eye 74 producing a second primarily helical direction 120. In some cases, other winding positions can be provided along a central length of the liner 108 that provide helical angles 138 below the LA and positive helical angles 119 above the LA, but in either case, within 60 degrees of the LA. These angles can vary randomly within each pass.

These angles can vary in a predefined manner within each pass. These angles can vary in a predefined manner from a first pass to subsequent passes.

The first eye 66 and the second eye 74 can be oriented such that the first eye 66 and the second eye 74 are at equal-and-opposite angles. For example, helical angles 138, 119 can comprise the same numerical value but be on opposite sides of the plane from which the angle is measured. In some embodiments, the helical angles 138, 119 can be different numerical values and be on opposite sides of the plane from which the angle is measured. In some embodiments, the helical angles 138, 119 can be different numerical values and be on the same side of the plane from which the angle is measured. In instances where the numerical values of the helical angles 138, 119 are different the angles can be within a predetermined number of degrees of each other. The values of the helical angles 138, 119 can change during the winding process and may apply at any specific instances in time during the winding process.

The change of the values of the helical angles 138, 119 during the winding process may be controlled. For example, the relationship between the helical angles 138, 119 (e.g., whether the helical angles 138, 119 have the same or different numerical values and/or the difference in values) can be maintained or controlled during the winding process. In one non-limiting example, if the helical angle 138 increases by 5 degrees, helical angle 119 may also increase by 5 degrees. In another non-limiting example, if the helical angle 138 increases by 5 degrees, helical angle 119 may decrease by 5 degrees. In another non-limiting example, the change in degrees of the helical angles 138, 119 may be unrelated to each other.

FIG. 10D shows a winding position W9, which corresponds to another winding condition or configuration of the winding apparatus 50. In the winding position W9 the first carriage 62 and the second carriage 70 are moved such that the first filament 112A and the second filament 112B are spooled out at different angles from those of the winding position W8, but both still preferably in the primarily helical direction. The first carriage 62 is moved along the longitudinal axis of the liner 108 to a position spaced apart from the position of the first carriage 62 in the winding position W8. The first eye 66 is oriented to a first helical angle 121. The helical angle 121 can be between less than about 90 degrees from a meridian of the liner 108. In some cases, the primarily helical direction 118 corresponds to a helical angle 121 between about 0 and about 20 degrees from a meridian of the liner 108. In some cases, the primarily helical direction 118 corresponds to a helical angle 121 between about 0 and about 10 degrees from a meridian of the liner 108.

The winding position W9 provides in some cases that the second primarily helical direction 120 corresponds to a helical angle 168 between about 0 and about 20 degrees from a meridian of the liner 108. The primarily helical direction 120 can correspond to a helical angle 168 between about 0 and about 10 degrees of a meridian of the liner 108. The primarily helical direction 120 can correspond to a position between about 0 and about 5 degrees of a meridian of the liner 108.

Other winding positions are possible between the winding position W8 and the winding position W9. In some cases, the first carriage 62 and the second carriage 70 move along the length of the liner 108 several times to provide for complete coverage of the liner 108 as discussed further below. As the first carriage 62 and second carriage 70 move the winding position W8 and the winding position W9 can vary such that the angles of the first filament 112A and the second filament 112B to the meridian or to each other vary over the length of the structural shell 104.

FIG. 10D shows that the winding process results in a woven or interwoven structure of the first filament 112A and the second filament 112B. The process enables continuous strands of the filament 112 and the second filament 112B to achieve complete coverage of the liner 108 without requiring cutting of the first filament 112A to allow the filament 112 to be reoriented from a first angle to a second angle, both oriented in the primarily helical direction.

FIG. 10D shows that as the first carriage 62 and the second carriage 70 progress in the winding position W8, a single turn of the second filament 112B will pass over and under adjacent strands of the first filament 112A. In particular, the middle segment of the second filament 112B is seen to pass over the upper-most two segments of the first filament 112A and to pass under the lower-most segment of the first filament 112A depicted. This provides an interwoven or woven configuration of the second filament 112B and the first filament 112A. The same can be said for the first filament 112A. The middle segment of the first filament 112A can be seen to pass under the lower-most two segments of the second filament 112B while passing over the upper-most segment of the second filament 112B. This provides an interwoven or woven configuration of the first filament 112A and the second filament 112B. These over-under arrangements of the first filament 112A and the second filament 112B provide uniformity in material properties, in particular of stiffness, across the expanse of a layer 128 in the radial direction as a three dimensional interwoven construct is formed, as discussed further below.

The winding position W8 produces a first braid angle $\alpha 2$. The first braid angle $\alpha 2$ can be less than or equal to about 90 degrees, or within a range defined by any two of the foregoing end points, between first filament 112A in a first primarily helical direction 118 and an adjacent woven second filament 112B in a second primarily helical direction 120. The winding position W9 produces a fourth braid angle $\theta 2$ between the primarily helical direction 120 and the primarily helical direction 118. The fourth braid angle $\theta 2$ can be less than or equal to about 90 degrees, or within a range defined by any two of the foregoing end points, between a first filament 112A in a primarily helical direction 118 and an adjacent woven second filament 112B in a primarily helical direction 120. In one embodiment, the fourth braid angle $\theta 2$ in the winding position W9 is the same as the first braid angle $\alpha 2$ in the winding position W8.

While FIG. 10D illustrates the first eye 66 and the second eye 74 at a similar longitudinal location relative to the length of the liner 108, when the first eye 66 and the second eye 74 move asynchronously relative to each other, the first eye 66 and the second eye 74 are often not at similar longitudinal locations and winding directions. As a result, while the filament may nonetheless be interweaved, it may not be interweaved in a tight lattice arrangement as depicted in FIG. 10D. FIG. 10E illustrates an arrangement where the first eye 66 and the second eye 74 are at different longitudinal locations along the length of the liner 108.

FIG. 10E illustrates the first eye 66 and the second eye 74 both winding in a primarily helical angle or low-angle helical orientation. FIG. 10E also illustrates the first eye 66 winding underneath or behind the liner 108 into the page. As shown in FIG. 10E, the first eye 66 and the second eye 74 may move independently and thus are at different longitudinal locations along the length of the liner 108. In addition, the wind angles 138, 119 may be different, resulting in further variations on locations of the first eye 66 and the second eye 74 along the length of the liner 108 as the filament is deposited onto the liner. Nonetheless, the first eye 66 and the second eye 74 still create interwoven strands of filament as they deposit filament onto the liner 108. As the first filament 112A and the second filament 112B are deposited, they create braid angles, as described herein. While FIG. 10E illustrates the first eye 66 moving left to right and the second eye 74 moving right to left, because of the asynchronous movement of the first eye 66 relative to the second eye 74, at some points during the winding, the first eye 66 and the second eye 74 may be moving in the same direction, or the first eye 66 and the second eye 74 may be moving in opposite directions.

Whether the first eye 66 and the second eye 74 are both winding in a primarily helical direction (or low-angle helical direction), both winding in a primarily hoop direction (or hoop direction or high-angle helical direction), or one in a primarily helical direction and the other in a primarily hoop direction, in some embodiments, the first eye 66 and the second eye 74 move independently of one another and asynchronously. That is, the first eye 66 and the second eye 74 do not mirror each other relative to any reference point, axis, or plane. In other embodiments, the first eye 66 and the second eye 74 move in a coordinated manner, mirroring each other relative to a reference point, axis, or plane.

In embodiments where the first eye 66 and the second eye 74 are moving independently and asynchronously, the first eye 66 and the second eye 74 may deposit filament in a different manner. For example, the length of the liner 108 over which the first eye 66 deposits filament may be different from the length of the liner 108 over which the second eye 74 deposits filament. In another example, the circuit value (i.e., the number of complete length traversals of the liner 108 required for complete coverage) of the first eye 66 may be different than the second eye 74. In another example, a loop order (i.e., the number of circuits before the winding band starts laying adjacent to the first circuit) of the first eye 66 may be different than the second eye 74. In this way, the first eye 66 and the second eye 74 moving independently and asynchronously may allow for specific distributions of filament on the liner 108. By contrast, a synchronized carriage motion would result in a same uniform distribution of filament over the liner 108, and it would not interweave as described herein.

Figure 10F:
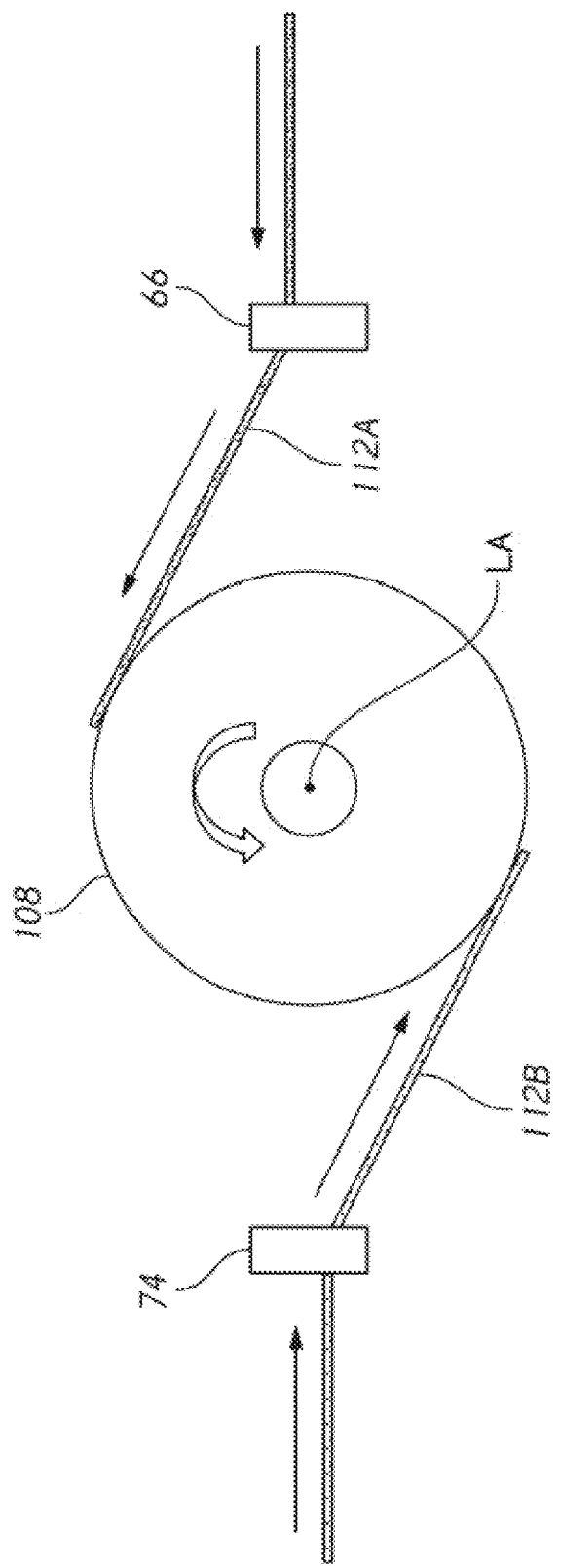
FIG. 10F is a schematic diagram further illustrating the winding apparatus of FIG. 9 and example methods of winding filaments therewith.

While FIGS. 10A, 10B, and 10D illustrate the filament deposited by both eyes over the "top" of the liner 108, one of the eyes may actually be depositing filament on the other side (i.e., the "bottom") of the liner 108, due to the rotation of the liner 108 about the longitudinal axis LA, for example as shown in FIG. 10F and also shown in FIG. 10C and FIG. 10E.

Figure 11A:
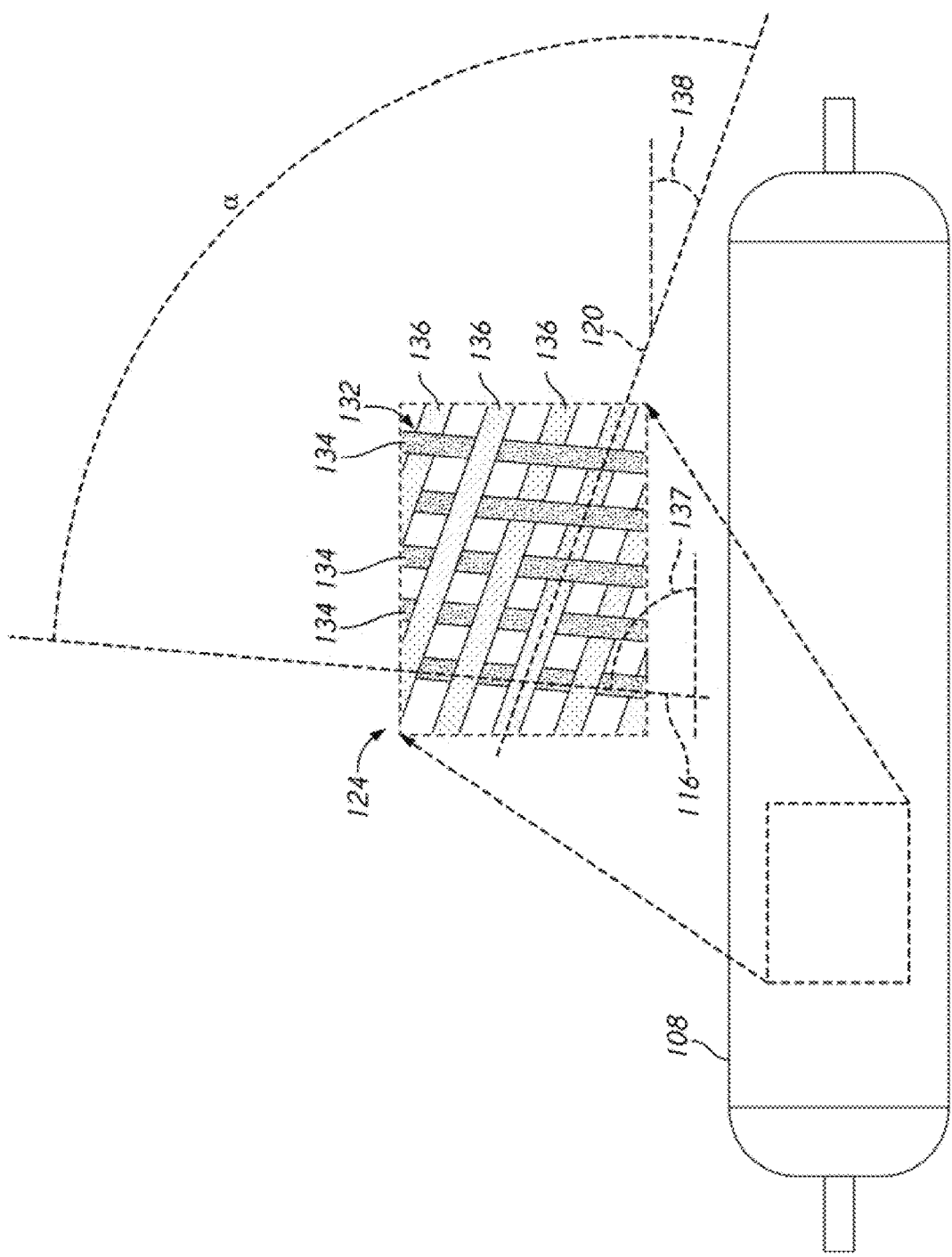
FIG. 11A is a schematic view of the gas cylinder seen in FIG. 9 with a portion of a woven structure shown in detail.

FIGS. 11A-11D show four portions of a woven structure 124 in which the first filament 112A and the second filament 112B are interwoven in a layer 128 upon the liner 108. FIG. 11A shows a portion of the woven structure 124 in which first interweave hoop strands 134 of the first filament 112A are oriented at a hoop angle 137 and the first interweave helical strands 136 of the second filament 112B are oriented at a helical angle 138. The hoop angle 137 comprises an angle less than 90 degrees from a meridian of the liner 108. The helical angle 138 comprises a negative angle, e.g., about −20 degrees measured counter-clockwise from a meridian of the liner 108. Other values of the hoop angle 137 and the helical angle 138 are discussed above. In one embodiment a first braid angle α is defined between adjacent braided segments of the continuous filaments 112A, 112B. The first braid angle α is about 100 degrees in one embodiment, e.g., by virtue of the hoop angle 137 being about 80 degrees and the helical angle 138 being about negative 20 degrees. Other values of the first braid angle α are discussed above. The foregoing woven structure 124 forms a first interweave 132 between adjacent braided strands.

Figure 11B:
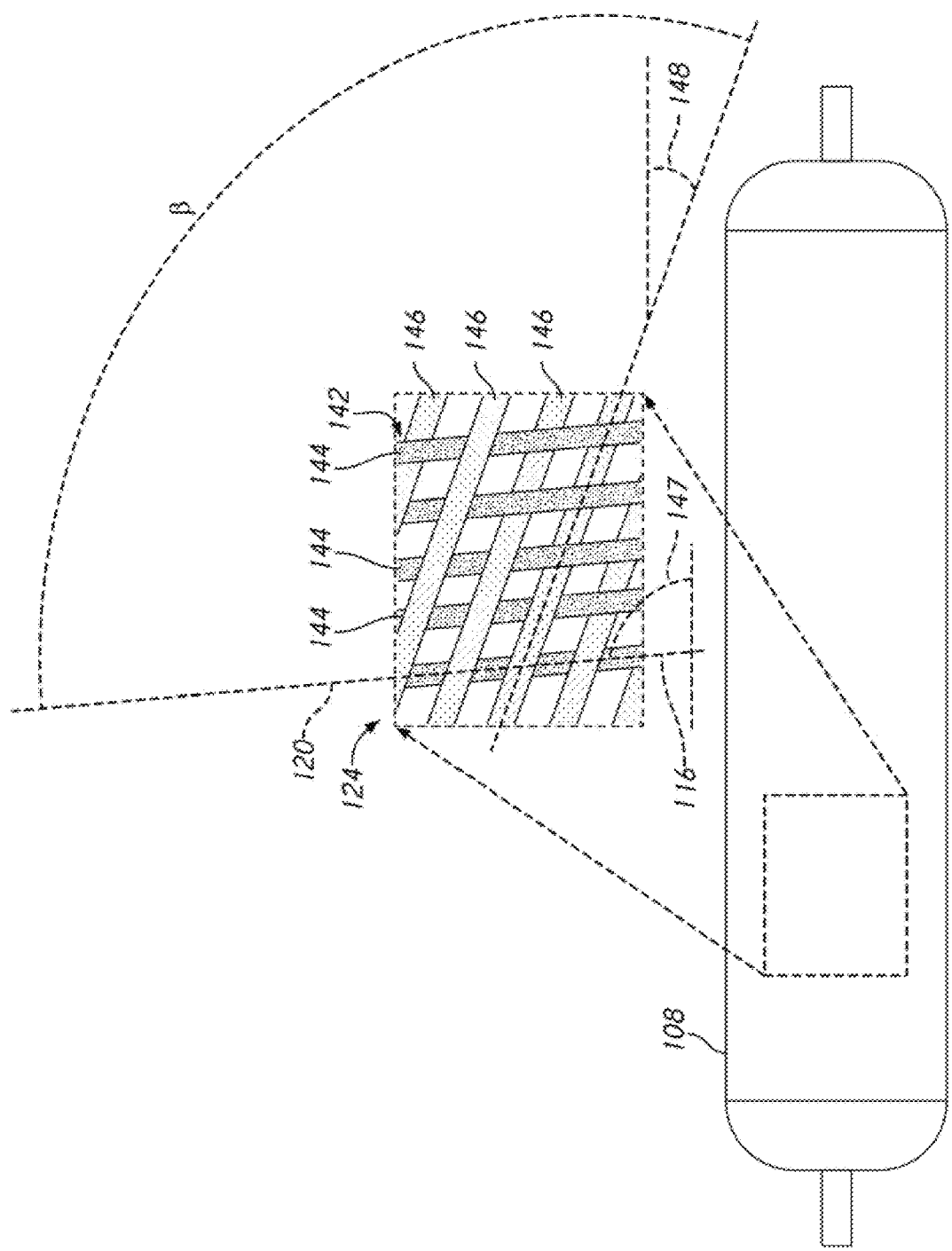
FIG. 11B is a schematic view of the gas cylinder seen in FIG. 9 with another portion of a woven structure shown in detail.

FIG. 11B shows another portion of the woven structure 124 in which second interweave hoop strands 144 of the first filament 112A are oriented at hoop angle 147 and second interweave helical strands 146 of the second filament 112B are oriented at helical angle 148. The hoop angle 147 can comprise an angle more than 90 degrees from a meridian of the liner 108, e.g., about 95 degrees, about 100 degrees, about 105 degrees, about 110 degrees, about 115 degrees about 120 degrees, or within a range including any of the foregoing as end points. The helical angle 148 comprises a negative angle, that is measured counter-clockwise from a meridian of the liner 108. The helical angle 148 can be the same as any of the examples of the helical angle 138. In one embodiment a second braid angle R is defined between adjacent braided segments of the continuous filaments 112A, 112B. The second braid angle R can be about 130 degrees in one embodiment, e.g., by virtue of the hoop angle 147 being about 110 degrees and the helical angle 148 being about negative 20 degrees. Other second braid angles β are possible by combination of the foregoing example values for the hoop angle 147 and the helical angle 148. The foregoing woven structure 124 forms a second interweave 142 between adjacent braided strands.

FIG. 11C shows another portion of the woven structure 124 in which third interweave hoop strands 154 of the first filament 112A are oriented at hoop angle 157 and third interweave helical strands 156 of the second filament 112B are oriented at helical angle 158. The hoop angle 157 comprises an angle less than 90 degrees from a meridian of the liner 108. The hoop angle 157 can be any of the angles discussed above in connection with the hoop angle 137. The helical angle 158 can comprise a positive angle. In one embodiment a third braid angle δ is defined between adjacent braided segments of the continuous filaments 112A, 112B. The third braid angle δ can about 60 degrees in one embodiment, e.g., by virtue of the hoop angle 157 being about 80 degrees and the helical angle 158 being about 20 degrees. The helical angle 158 can be the absolute values of any of the angles discussed above in connection with the helical angle 138. The third braid angle δ can be any combination of angles disclosed in connection with the hoop angle 157 and the helical angle 158. The foregoing woven structure 124 forms a third interweave 152 between adjacent braided strands.

Figure 11D:
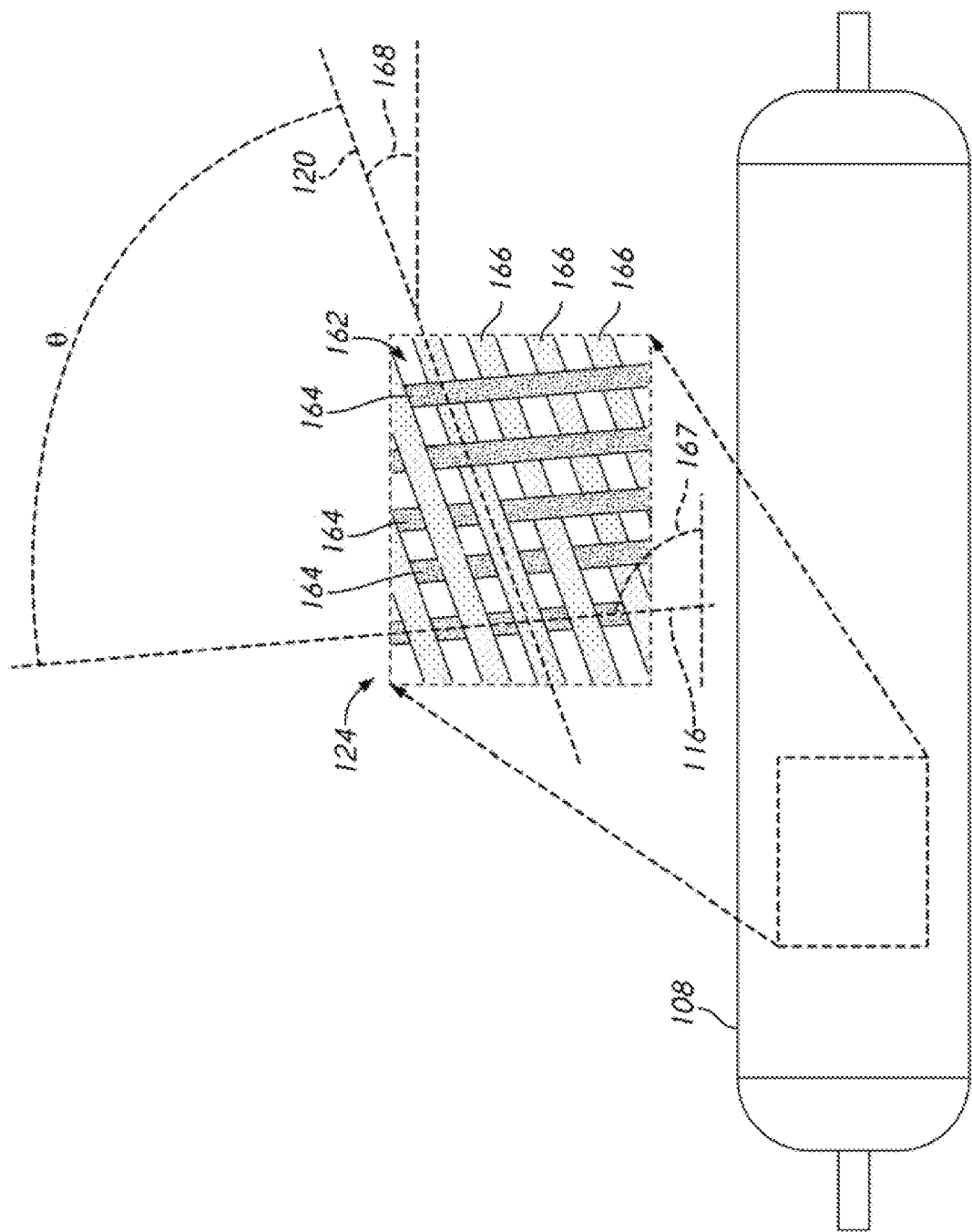
FIG. 11D is a schematic view of the gas cylinder seen in FIG. 9 with another portion of a woven structure shown in detail.

FIG. 11D shows another portion of the woven structure 124 in which fourth interweave hoop strands 164 of the first filament 112A are oriented at hoop angle 167 and fourth interweave helical strands 166 of the second filament 112B are oriented at helical angle 168. The hoop angle 167 comprises an angle greater than 90 degrees from a meridian of the liner 108. The hoop angle 167 can be a value corresponding to any value disclosed in connection with the hoop angle 147. The helical angle 168 comprises a positive angle, e.g., any of the values disclosed in connection with the helical angle 158. In one embodiment a fourth braid angle θ is defined between adjacent braided segments of the continuous filaments 112A, 112B. The fourth braid angle θ can be about 90 degrees in one embodiment, e.g., by virtue of the hoop angle 167 being about 110 degrees and the helical angle 168 being about 20 degrees. Other values of the fourth braid angle θ can be determined by combinations of the values disclosed in connection with the hoop angle 167 and the helical angle 168. The foregoing woven structure 124 forms a fourth interweave 162 between adjacent braided strands.

The first interweave 132, the second interweave 142, the third interweave 152, and the fourth interweave 162 could each result from a discrete winding position. For example, the first interweave 132 corresponds to the winding position W1 and the fourth interweave 162 corresponds to the winding position W4. Although four distinct winding positions can generate the four interweaves illustrated in FIGS. 11A-11D, a winding method can include more than four winding positions. The winding angle of the first filament 112A and the second filament 112B can vary from the highest to the lowest winding angles for the primarily hoop direction 116 and the primarily helical direction 120 respectively. In some cases, a number of turns can be provided in a winding position, followed by one or more turns in a different winding position to adjust the angle approaching a boundary condition of the pressure vessel 100, such as an edge of a structure, an inflection point, or a physical feature.

Figure 12:
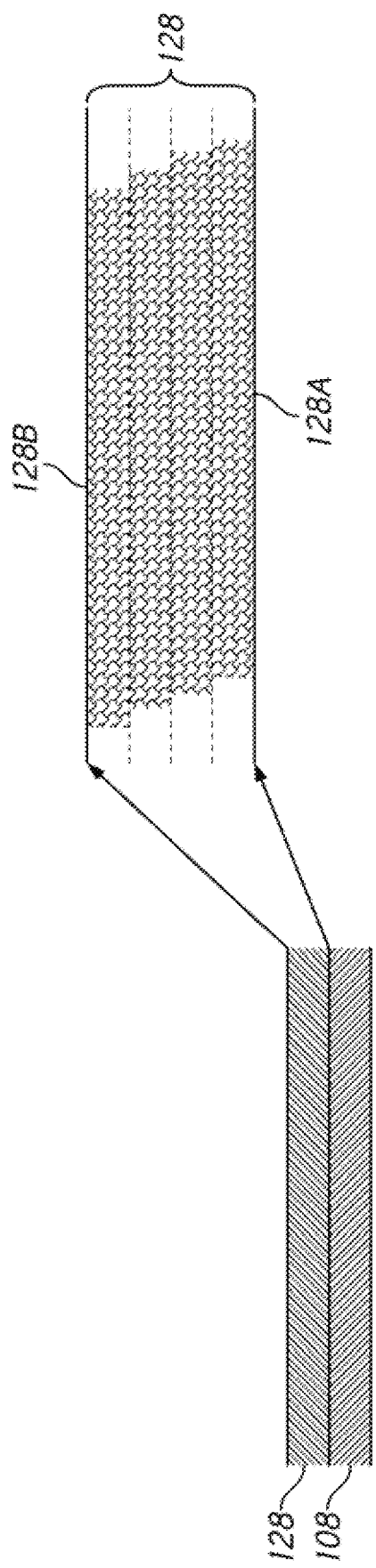
FIG. 12 is a cross-sectional view of a portion of a gas cylinder produced by the winding apparatus and method illustrated in FIGS. 9-11D.

FIG. 12 shows a schematic cross-section of a wall of the pressure vessel 100. In one embodiment, the innermost cavity of the pressure vessel 100 is surrounded by an inner wall of the liner 108. The liner 108 can be lightweight polymeric liner, as discussed above. The outer surface of the liner 108 can be surrounded by a layer 128 that comprises a three dimensional interwoven construct. The layer 128 is formed by two to thirty, in some cases six to twenty, e.g., fifteen passes of the first carriage 62 and the second carriage 70 of the winding apparatus 50 along the liner 108 as the liner 108 is rotated by the spindle 54. Each pass can apply one to ten, in some cases two to eight, e.g., four, five, six, or seven loops of the first filament 112A in the primarily hoop direction 116. Each pass can apply one to ten, in some cases two to eight, e.g., four, five, six, or seven loops of the second filament 112B in the primarily helical direction 120. In each pass and for each revolution of the liner 108 the second filament 112B are woven with the first filament 112A, e.g., causing each arcuate segment of the first filament 112A to pass under one or more and over one or more (e.g., a plurality of) successive segments of the second filament 112B and/or causing each arcuate segment of the second filament 112B to pass under one or more and over one or more (e.g., a plurality of) successive segments of the second filament 112B. The result is a continuous layer 128 of braided reinforcement. The layer 128 is a three dimensional interwoven construct because each pass of the first carriage 62 and the second carriage 70 cause the first eye 66 and the second eye 74 to build additional woven thickness to the initial thickness applied to the outer surface of the liner 108. The stiffness of the structural shell 104 is uniform in a radial direction through the layer 128 due to the first filament 112A and the second filament 112B being present at the same proportions at various radial positions of the layer 128.

The continuous nature of the layer 128 is illustrated by FIG. 12 which shows a solid line at an inner surface boundary at an innermost portion 128A of the layer 128 and a solid line at an outer surface boundary at an outermost portion 128B of the layer 128 without discrete boundary layers between the inner and outermost portions. The dashed lines on FIG. 12 illustrate that the entire thickness of the layer 128 can be a result of many passes of the first carriage 62 and the second carriage 70 across the liner 108. However, the winding process results in a bulk of continuous material without stiffness property boundaries between these winding passes. The winding processes disclosed herein can also avoid discrete boundaries between areas where filaments are oriented only primarily in a hoop direction without any filament in the primarily helical direction and adjacent areas where filaments are oriented only in primarily helical direction without any filament in the primarily hoop direction. For example, the interwoven techniques disclosed herein can avoid such discrete boundaries when winding a first filament in a primarily hoop direction and a second filament in a primarily helical direction, when winding both the first filament and the second filament in primarily hoop directions, and when winding both the first filament and the second filament in primarily helical directions. Although the dash lines suggest that the layer 128 may be built up with four passes of the first carriage 62 and the second carriage 70, the number of passes can be any number including fifteen or more passes to fully enclose the liner 108 in supportive filaments.

One example application of the foregoing is in the production of a hydrogen gas cylinder that can be used in fuel cell vehicles and other applications using hydrogen gas. In this application, the pressure vessel 100 is configured to sustain a 700 bar pressure in operation without failing. The first filament 112A comprises a high strength carbon fiber material wound in a primarily hoop direction or other directions (e.g., a primarily helical direction) as discussed above. The second filament 112B also comprises a carbon fiber material that is wound in a primarily helical direction or other directions (e.g., a primarily hoop direction) as discussed above. In one embodiment the first filament 112A and the second filament 112B include fibers with the same reinforcement capability, e.g., are formed with the same material composition and may be identical fibers. The first filament 112A and the second filament 112B both contribute to the radial load support, though the second filament 112B contributes more to axial load support. In some cases, the second filament 112B can be a lower performance (e.g., lower strength) configuration of carbon fiber. By interweaving the fibers, the production of the hydrogen gas cylinder can be completed quickly. This is at least in part due to reducing or eliminating the need to transition fibers between hoop and helical direction, either by cutting the fiber or by varying the winding angle from hoop to helical angles. The interwoven structure provides uniform stiffness even when the material properties of the filaments 112A, 112B vary.

Another example application of the foregoing is in the production of a lower cost and in some cases higher durability gas cylinder for CNG storage. In this approach, the first filament 112A can be configured with a high strength material. The second filament 112B can be configured with a lower strength (same or different) material. The first filament 112A can comprise high strength carbon fiber. The second filament 112B can comprise a lower strength material, e.g., glass fiber. The lower strength of glass fiber requires winding more material than structurally necessary. In particular the glass fiber is thicker than the carbon fiber. The additional material provides a weight penalty. However, the overall cost may be lower because glass fiber is less costly than carbon fiber. Also, glass fibers are more durable and have a higher resistance to fire. Furthermore, being thicker, glass fibers are also less sensitive to surface damage, such as cuts and abrasion from handling. Lower stiffness glass is also less prone to unravel if damaged. Thicker end portions also are more resistant to drop-impact damage. This may enable the carbon-glass version of the pressure vessel 100 to be shipped without additional foam "bumpers" which are held on by glue and which are added to protect cylinder.

Another example application of the foregoing is in the production of a pipe assembly. In this assembly, a form such as a pipe liner can be provided. The pipe liner can be similar to the liner 108. Unlike the pressure vessel 100, the pipe assembly may not be enclosed at the ends of the liner. This preserves the function of the pipe assembly to convey gasses and other fluids. The pipe assembly can incorporate the first filament 112A which can be configured with a high strength material. The second filament 112B can be configured with the same material or a lower strength (same or different) material. The first filament 112A can comprise high strength carbon fiber. The second filament 112B can also comprise high strength carbon fiber or a lower strength material, e.g., lower strength carbon fiber or a glass fiber. Interweaving the first filament 112A and the second filament 112B in a pipe assembly can provide high burst pressure performance. Interweaving the first filament 112A and the second filament 112B in a pipe assembly can provide fast throughput compared to other winding techniques.

Embodiments disclosed herein provide one or more of the following advantages. Significant cost savings can be realized by using a lower cost fiber for fibers wound in one direction, e.g., for the second filament 112B wound in the primarily helical direction 120. As discussed above, the second filament 112B can comprise glass fibers and/or lower strength carbon fibers as two examples of materials that can be used for the second filament. These fibers may be significantly lower cost than the first filament 112A wound in the primarily hoop direction 116, which in some case have higher strength configurations. As discussed above, some fibers (e.g., glass fibers) used for the second filament 112B may be thicker and thus may result in thicker end sections of the pressure vessel 100. The thicker end section may enable the elimination of strategies to improve drop test performance and/or other metrics of durability. This can reduce or eliminate the cost, weight, and manufacturing process associated with providing bumpers or other durability enhancements. In addition, glass fiber provides the additional benefit of being non-conductive and thus providing galvanic isolation with metallic bosses. Metallic bosses are integrated into the pressure vessel 100 in some embodiments, e.g., for connecting to piping outside the pressure vessel 100 and/or for mechanical support of the pressure vessel 100. Lower stressed fibers, e.g., glass fibers, are less subject to fragmentation should the pressure vessel 100 burst. Thus, providing such fibers in a portion of the pressure vessel 100, e.g., throughout the thickness, at the outer surface, etc., of the domed ends of the pressure vessel 100 enhances containment of materials on burst.

As discussed above, simultaneously winding fiber in the primarily hoop direction 116 and the primarily helical direction 120 can eliminate the need to transition between these directions where a single eye/single carriage is provided. These and other benefits of simultaneous winding enables the winding apparatus 50 to increase through-put, reduce winding times, and/or increase production capacity compared to winding hoop and helical layers in series or as wholly separate layers. In some cases, the layer 128 can provide a three dimensional interwoven structure. The outer surface of the layer 128 may be at the outer surface of the pressure vessel 100. In some embodiments, a complete winding of first filament 112A may be provided which may enable the use of other production systems in place of tank winding approaches that rely more on transitions, e.g., automated squeegees, sanding and other further gas cylinder processing.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A vehicle comprising:
   a cab;
   a plurality of wheels;
   one or more frame rails configured to support the cab and the plurality of wheels;
   an engine or power generation system configured to be powered by a fuel; and
   a pressure vessel configured to store the fuel to be used by the engine or power generation system, the pressure vessel comprising a structural shell formed by filament winding upon a substantially cylindrical form, wherein the structural shell comprises:
      a first filament comprising a first material composition wound about the substantially cylindrical form in a first primarily hoop direction; and
      a second filament comprising a second material composition that is different from the first material composition, the second filament wound about the substantially cylindrical form in a second primarily hoop direction;
   wherein the first filament and second filament are interwoven in a layer upon the substantially cylindrical form, the layer comprising a three-dimensional interwoven construct, and the layer comprising a first hoop filament and a second hoop filament crossing over each other at a first angle in a first portion of the three-dimensional interwoven construct, the first hoop filament and the second hoop filament crossing over each other at a second angle in a second portion of the three-dimensional interwoven construct.

2. The vehicle of claim 1, wherein the first material composition comprises carbon fiber.

3. The vehicle of claim 1, wherein the second material composition comprises glass fiber.

4. The vehicle of claim 1, wherein the layer comprises a continuous expanse from an outer surface of the substantially cylindrical form to the outer surface of the pressure vessel without layer boundaries therebetween.

5. A system comprising:
   at least one of an engine, a power generation system, or an auxiliary vehicle system, the at least one of an engine, a power generation system, or an auxiliary vehicle system being configured to be powered by a pressurized fluid;
   a housing configured to:
      couple to one or more frame rails of a vehicle, and
      receive and protect a pressure vessel configured to store the pressurized fluid to be used by the at least one of an engine, a power generation system, or an auxiliary vehicle system;
   wherein the pressure vessel comprises:
      a liner having a cylindrical center portion and two domed portions; and
      a structural shell being disposed directly around the liner, and comprising:
         a first filament wound about the liner in a first primarily hoop direction; and
         a second filament wound about the liner in a second primarily hoop direction;
      wherein the first filament and second filament are interwoven in a layer around the cylindrical center portion of the liner, the layer comprising a three-dimensional interwoven construct, and the layer comprising a first hoop filament and a second hoop filament crossing over each other at a first angle in a first portion of the three-dimensional interwoven construct, the first hoop filament and the second hoop filament crossing over each other at a second angle in a second portion of the three-dimensional interwoven construct.

6. The system of claim 5, further comprising a portion of at least one of the first filament and the second filament wound about the liner in a primarily helical direction around the two domed portions of the liner.

7. The system of claim 5, wherein a material composition of a material of the first filament comprises carbon fiber.

8. The system of claim 5, wherein a material composition of a material of the second filament comprises glass fiber.

9. The system of claim 5, wherein the layer comprises a continuous expanse from an outer surface of the liner to the outer surface of the pressure vessel without layer boundaries therebetween.

10. A system, comprising:

a pressure vessel configured to contain a pressurized fluid for powering at least one of an engine, a power generation system, or an auxiliary vehicle system;

wherein the pressure vessel comprises:

a substantially cylindrical liner;

a first filament wound about the substantially cylindrical liner in a first primarily hoop direction; and a second filament wound about the substantially cylindrical liner in a second primarily hoop direction;

wherein the first filament and second filament are woven upon the substantially cylindrical liner in a three-dimensional interwoven layer such that a first portion of the first filament is disposed over the second filament and a second portion of the first filament is disposed under the second filament, and wherein the three-dimensional interwoven layer comprises a first hoop filament and a second hoop filament crossing over each other at a first angle in a first portion of the three-dimensional interwoven layer and the first hoop filament and the second hoop filament crossing over each other at a second angle in a second portion of the three-dimensional interwoven layer.

11. The system of claim 10, wherein the pressure vessel further comprises a portion of at least one of the first filament and the second filament wound about the substantially cylindrical liner in a primarily helical direction.

12. The system of claim 10, wherein the first filament comprises a first material and the second filament comprises a second material that is different from the first material.

13. The system of claim 12, wherein the first material comprises a carbon fiber.

14. The system of claim 12, wherein the second material comprises a glass fiber.

15. The system of claim 10, wherein the three-dimensional interwoven layer further comprises a continuous expanse from an outer surface of the substantially cylindrical liner to the outer surface of the pressure vessel without layer boundaries therebetween.

16. The system of claim 10, wherein the first filament and the second filament are each configured with about the same strength along a longitudinal axis thereof.

* * * * *